(12) United States Patent  
Norton et al.

(10) Patent No.: US 11,620,455 B2
(45) Date of Patent: Apr. 4, 2023

(54) INTELLIGENTLY SUMMARIZING AND PRESENTING TEXTUAL RESPONSES WITH MACHINE LEARNING

(71) Applicant: Qualtrics, LLC, Provo, UT (US)

(72) Inventors: R. David Norton, Orem, UT (US); Jamie Morningstar, Orem, UT (US); Zheng Fang, Kenmore, WA (US)

(73) Assignee: Qualtrics, LLC, Provo, UT (US)

( * ) Notice: Subject to any disclaimer, the term of this patent is extended or adjusted under 35 U.S.C. 154(b) by 0 days.

(21) Appl. No.: 17/493,258

(22) Filed: Oct. 4, 2021

(65) Prior Publication Data

US 2022/0156464 A1 May 19, 2022

Related U.S. Application Data

(63) Continuation of application No. 16/289,398, filed on Feb. 28, 2019, now Pat. No. 11,138,378.

(51) Int. Cl.
*G06F 40/30* (2020.01)
*G06F 16/33* (2019.01)
(Continued)

(52) U.S. Cl.
CPC .......... *G06F 40/30* (2020.01); *G06F 16/3344* (2019.01); *G06N 3/04* (2013.01); *G06N 3/08* (2013.01)

(58) Field of Classification Search
CPC .............................. G06F 40/30; G06F 16/3344
(Continued)

(56) References Cited

U.S. PATENT DOCUMENTS 9,047,283 B1 6/2015 Zhang et al.
9,213,997 B2 12/2015 Chatterjee et al.
(Continued)

OTHER PUBLICATIONS

U.S. Appl. No. 16/289,398, filed Jan. 12, 2021, Office Action.
U.S. Appl. No. 16/289,398, filed Jun. 3, 2021, Notice of Allowance.

*Primary Examiner* — Susan I McFadden
(74) *Attorney, Agent, or Firm* — Keller Preece PLLC

(57) ABSTRACT

This disclosure relates to methods, non-transitory computer readable media, and systems apply machine-learning techniques and computational sentiment analysis to summarize sentences extracted from a group of textual responses or to select representative-textual responses from the group of textual responses. By using a response-extraction-neural network to extract (and sometimes paraphrase) sentences from textual responses, the disclosed methods, non-transitory computer readable media, and systems can generate a response summary of textual responses based on sentiment indicators corresponding to the textual responses. By applying a machine-learning classifier to generate textual quality scores for textual responses, the disclosed methods, non-transitory computer readable media, and systems select representative-textual responses from a group of textual responses based on relevancy parameters and sentiment indicators corresponding to the textual responses. Such computational techniques generate response summaries and representative responses that provide an efficient snapshot of a group of textual responses analyzed by machine learners.

20 Claims, 18 Drawing Sheets

(51) Int. Cl.
*G06N 3/08* (2023.01)
*G06N 3/04* (2023.01)

(58) Field of Classification Search
USPC .............................................. 704/9
See application file for complete search history.

(56) References Cited

U.S. PATENT DOCUMENTS

| | | |
|---|---|---|
| 9,483,730 B2 | 11/2016 | Di Fabbrizio et al. |
| 9,632,998 B2 | 4/2017 | Aharoni et al. |
| 9,916,538 B2 | 3/2018 | Zadeh et al. |
| 10,303,999 B2 | 5/2019 | Hertz et al. |
| 10,366,168 B2 * | 7/2019 | Wu .................. G06F 40/30 |
| 10,410,224 B1 | 9/2019 | Levanon et al. |
| 10,678,816 B2 | 6/2020 | Peng et al. |
| 10,679,008 B2 | 6/2020 | Dubey et al. |
| 10,832,001 B2 | 11/2020 | Dadachev et al. |
| 10,839,021 B2 | 11/2020 | Kleiman-Weiner et al. |
| 11,138,378 B2 * | 10/2021 | Norton ................ G06N 3/04 |

* cited by examiner

Fig. 4A

Customer Experience

Survey  Actions  Distributions  Data & Analysis  Reports

Data  Text  Analysis  Cross Tabs  Weighting

Question: Q2: Comments

Find...

Sentiment
• Positive  • Neutral  • Negative

Time Period
Quarter 1 ⌄
Jan 2018 — Apr 2018 — Jan 2019

All Topics
▲ Music         2,516
▲ Kids          2,038
▲ News          1,824
▲ Ordering      1,075
▲ Reminders       580
▲ Pants           300

Summary | All Topics | Jan. 2018 – Apr. 2018  }—412a

I like Malkin's clothing for its professional look and good quality. The clothing comes in a variety of sizes but can be inconsistent across styles. But the prices are too expensive and in-store customer service representatives can be difficult to work with for exchanges.  }—414a

*Fig. 6A*

INTELLIGENTLY SUMMARIZING AND PRESENTING TEXTUAL RESPONSES WITH MACHINE LEARNING

CROSS-REFERENCE TO RELATED APPLICATIONS

The present application is a continuation of U.S. application Ser. No. 16/289,398, filed on Feb. 28, 2019. The aforementioned application is hereby incorporated by reference in its entirety.

BACKGROUND

Comment-review systems currently display categorized or popular textual comments on various software applications and websites for the purchase or review of products and services. For example, comment-review systems often surface popular reviews of places and products on crowd-source-review forums or electronic-commerce sites on the Internet. To display such categorized or popular textual comments, some comment-review systems select comments by users based on (i) verifying the user purchased or used a reviewed item, (ii) views of (or votes for) comments posted via an application or website, or (iii) keyword searches or frequently answered questions from users. Despite facilitating access to comments on such applications and websites, existing technical applications limit conventional comment-review systems to surfacing comments unrepresentative of a larger body of comments, hiding other or more common comments behind layers of user interfaces, or retrieving comments that match narrow or rigid filters. The following paragraphs describe some of these technical deficiencies.

By relying on verification or voting to select textual comments, some conventional comment-review systems select textual comments that are outliers in comparison to other comments received by an application or site. While outlier comments can be helpful, a comment-review system may apply an algorithm that inadvertently selects them for display because the comments are humorous, entertaining, or unusually detailed. Such comments can mislead users when analyzing or reviewing a body of comments. By selecting for comments based on voting or views, conventional comment-review systems can also surface textual comments that capture isolated user experiences unrepresentative of the body of comments, such as reviews describing unusually good or bad experiences with a product—including one-of-a-kind manufacturing defects or service experiences.

In addition to displaying outlier comments, some existing comment-review systems include filtering or search functions that return textual comments defined by narrow search algorithms or comments hand selected by humans. For instance, comment-review systems sometimes include keyword-search functions that identify textual comments matching keywords entered by users or synonyms of such keywords. As a further example, comment-review systems can display comments selected or entered by users in response to frequently asked questions ("FAQs"). But displaying outlier comments, keyword-search functionalities, and user-selected answers can bury or obscure more common textual comments from users. Conventional comment-review systems often provide users access to more common comments only with multiple selectable options and user interfaces through which a user must navigate.

Because of the technical limitations of conventional comment-review systems, some firms or organizations rely on human reviewers to analyze textual comments. But human review of such comments can be labor intensive, expensive, and produce inaccurate or inconsistent analyses. For example, human review of thousands, or tens or hundreds of thousands, or even millions of textual comments may need to be split between multiple groups of reviewers and subject such review to different human approaches or inconsistent viewpoints. In many cases, the volume of textual comments is practically impossible for humans to analyze. Indeed, humans often cannot accurately or consistently analyze or process such volumes of textual comments. Nor do existing conventional-comment review systems provide tools for consistent analysis of a common body of comments or review free from the technical limitations described above.

SUMMARY

This disclosure describes one or more embodiments of methods, non-transitory computer readable media, and systems that solve the foregoing problems in addition to providing other benefits. For example, in some embodiments, the disclosed systems apply machine-learning techniques to summarize sentences extracted from a group of textual responses or to select representative-textual responses from the group of textual responses. By using a response-extraction-neural network to extract sentences from textual responses, the disclosed systems can generate a response summary of textual responses based on sentiment indicators corresponding to the textual responses. By applying a machine-learning classifier to generate textual quality scores for textual responses, the disclosed systems select representative-textual responses from a group of textual responses based on relevancy parameters and sentiment indicators corresponding to the textual responses. Such computational techniques generate response summaries and representative responses that provide efficient snapshots of a group of textual responses analyzed by machine learners.

In some embodiments, for instance, the disclosed systems provide textual responses to a response-extraction-neural network to generate extracted sentences that correspond to selected sentences from the textual responses. The disclosed systems further determine a sentiment indicator for each extracted sentence to sort the extracted sentences. Based on a sorted set of the extracted sentences, the disclosed systems generate a first cluster of extracted sentences corresponding to a first context and a second cluster of extracted sentences corresponding to a second context. Based on a first extracted sentence from the first cluster and a second extracted sentence from the second cluster, the disclosed systems generate a response summary for the textual responses.

Additionally, in certain implementations, the disclosed systems provide textual responses to a text-quality classifier to generate a textual quality score for each textual response. The disclosed systems further determine a relevancy parameter, a sentiment indicator, and a topic for each textual response. In each such determination, the relevancy parameter indicates a relevance of a given textual response to a user query, the sentiment indicator indicates a linguistic sentiment of the given textual response, and the topic indicates a subject matter of the given textual response. Based on the sentiment indicator and the topic for each textual response, the disclosed systems generate a first response group of textual responses and a second response group of textual responses. Based on the relevancy parameter for each textual response within the first and second response groups, the disclosed systems further select representative-textual responses for display on a client device— including a first representative-textual response from the first response group and a second representative-textual response from the second response group.

BRIEF DESCRIPTION OF THE DRAWINGS

The detailed description refers to the drawings briefly described below.

FIGS. 4A-4B illustrate a computing device presenting response summaries in graphical user interfaces in accordance with one or more embodiments.

FIGS. 6A-6B illustrate a computing device presenting representative-textual responses in graphical user interfaces in accordance with one or more embodiments.

DETAILED DESCRIPTION

Figure 1:
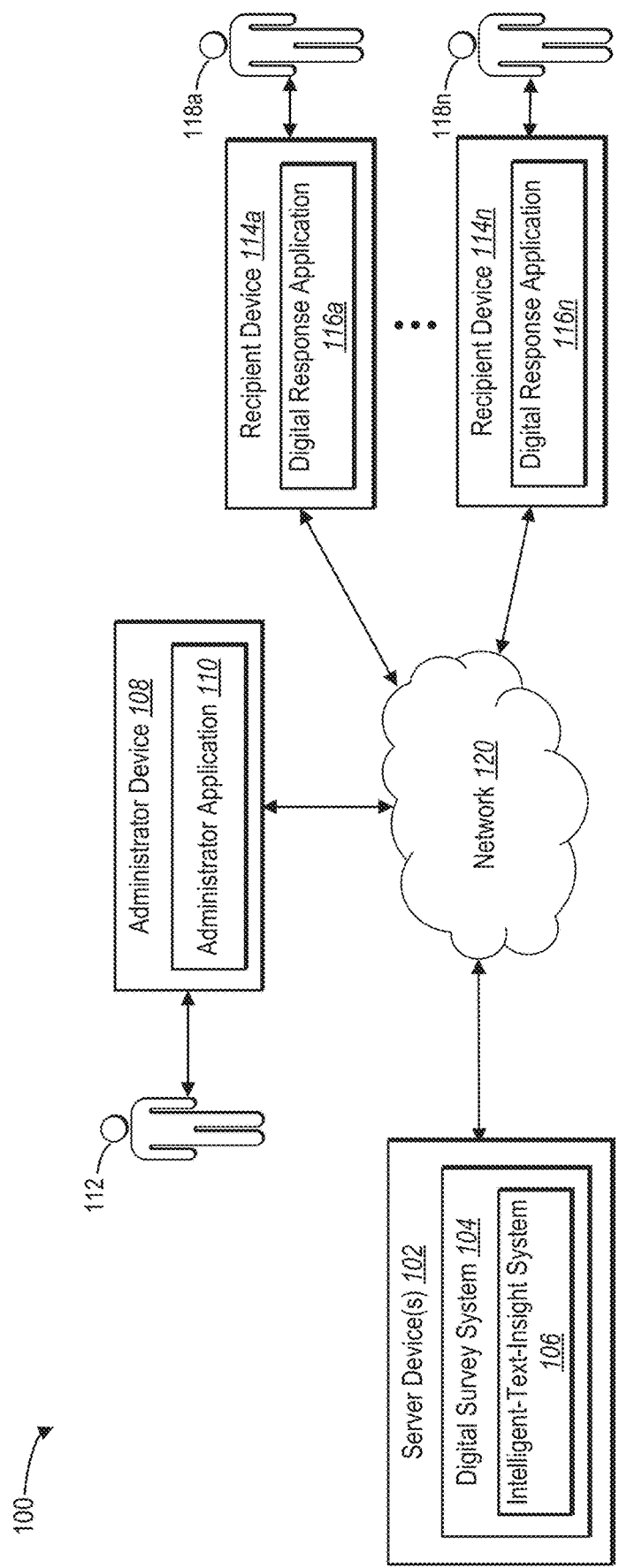
FIG. 1 illustrates a block diagram of an environment in which an intelligent-text-insight system can operate in accordance with one or more embodiments.

This disclosure describes embodiments of an intelligent-text-insight system that applies machine-learning techniques and computational sentiment analysis to summarize sentences extracted from a group of textual responses or to select representative-textual responses from the group of textual responses. The intelligent-text-insight system can generate a response summary of textual responses by using (i) a response-extraction-neural network to extract (and sometimes paraphrase) sentences from textual responses and (ii) sentiment indicators corresponding to the textual responses. The intelligent-text-insight system can also select representative-textual responses from a group of textual responses by using (i) a machine-learning classifier to generate textual quality scores for textual responses and (ii) relevancy parameters and sentiment indicators corresponding to the textual responses. Such computational techniques generate response summaries and representative responses that provide machine-learning-customized snapshots of a group of textual responses.

As mentioned above, in some embodiments, the intelligent-text-insight system provides textual responses to a response-extraction-neural network to generate extracted sentences that correspond to selected sentences from the textual responses. The intelligent-text-insight system further determines a sentiment indicator for each extracted sentence to sort the extracted sentences. Based on a sorted set of the extracted sentences, the intelligent-text-insight system generates a first cluster of extracted sentences corresponding to a first context and a second cluster of extracted sentences corresponding to a second context. Based on a first extracted sentence from the first cluster and a second extracted sentence from the second cluster, the intelligent-text-insight system subsequently generates a response summary for the textual responses. As described below, the first and second clusters of extracted sentences are merely examples. The intelligent-text-insight system can extract and generate such a response summary based on any number of extracted-sentence clusters corresponding to any number of contexts.

To provide textual responses to the response-extraction-neural network, in certain implementations, the intelligent-text-insight system selects a set of textual responses based on a user query or computer-generated query. For instance, the intelligent-text-insight system can receive a user query from a client device searching for textual responses that correspond to a time period or topic and that respond to a survey question. The intelligent-text-insight system subsequently selects a set of textual responses to feed the response-extraction-neural network based on (i) time identifiers for textual responses that correspond to the queried time period or (ii) relevance of textual responses to the queried topic. In response to a query by time period or topic, the intelligent-text-insight system can provide a response summary for the set of textual responses to the client device for display within a graphical user interface.

In addition to extracting sentences from textual responses, in some embodiments, the response-extraction-neural network further paraphrases the extracted sentences. To paraphrase such sentences, the intelligent-text-insight system optionally trains both an extractor-selection network of the response-extraction-neural network to extract selected sentences and an abstractor network of the response-extraction-neural network to paraphrase selected sentences. Having trained the response-extraction-neural network, the intelligent-text-insight system can extract selected sentences from a set of textual responses using the extractor-selection network of the response-extraction-neural network. Upon extraction, the intelligent-text-insight system can paraphrase one or more of the selected sentences using the abstractor network of the response-extraction-neural network.

As suggested above, the intelligent-text-insight system can apply computational sentiment analysis to extracted sentences. For instance, having extracted sentences from textual responses, in certain implementations, the intelligent-text-insight system determines sentiment indicators by determining a sentiment score indicating a positive sentiment or a negative sentiment for each extracted sentence. Based on such sentiment scores, the intelligent-text-insight system optionally generates clusters of extracted sentences. For instance, in some cases, the intelligent-text-insight system generates clusters of extracted sentences that correspond to positive or negative sentiment scores and to a first or second linguistic context embedding.

After generating clusters of extracted sentences, in some embodiments, the intelligent-text-insight system selects extracted sentences from such clusters based on a relevance of each extracted sentence to a context of a cluster (e.g., a linguistic context embedding). For instance, in certain implementations, the intelligent-text-insight system selects first and second extracted sentences respectively from first and second clusters based on the maximum marginal relevance of the extracted sentences to the first and second linguistic context embeddings for their respective clusters. In some such cases, the intelligent-text-insight system selects multiple extracted sentences from each cluster of extracted sentences.

Based on selected and extracted sentences, the intelligent-text-insight system subsequently generates a response summary. For example, in some embodiments, the intelligent-text-insight system generates a response summary for a set of textual responses comprising both a first extracted sentence (from a first cluster) and a second extracted sentence (from a second cluster). By contrast, in certain implementations, the intelligent-text-insight system uses a summarization neural network to generate compressed sentences representing summaries of multiple extracted sentences from each cluster and composes a response summary comprising the compressed sentences.

In addition (or in the alternative) to generating a response summary for textual responses, the intelligent-text-insight system can use machine-learning techniques to select representative-textual responses from a set of textual responses. For instance, in some embodiments, the intelligent-text-insight system provides textual responses to a text-quality classifier to generate a textual quality score for each textual response. The intelligent-text-insight system further determines a relevancy parameter, a sentiment indicator, and a topic for each textual response. In each such determination, the relevancy parameter indicates a relevance of a given textual response to a user query, the sentiment indicator indicates a linguistic sentiment of the given textual response, and the topic indicates a subject matter of the given textual response. Based on the sentiment indicator and the topic for each textual response, the intelligent-text-insight system generates a first response group of textual responses and a second response group of textual responses. Based on the relevancy parameter for each textual response within the first and second response groups, the intelligent-text-insight system further selects representative-textual responses for display on a client device— including a first representative-textual response from the first response group and a second representative-textual response from the second response group. As described below, the first and second response groups and representative-textual responses are merely examples. The intelligent-text-insight system can generate any number of response groups of textual responses and select any number of representative-textual responses.

To provide textual responses to the text-quality classifier, in certain implementations, the intelligent-text-insight system selects a set of textual responses based on a user query or computer-generated query. For instance, the intelligent-text-insight system can select a set of textual responses to feed the text-quality classifier based on (i) time identifiers for textual responses that correspond to a queried time period or (ii) textual responses relevant to a queried topic. In response to a query by time period or topic, the intelligent-text-insight system can provide representative-textual responses from a set of textual responses to the client device for display within a graphical user interface.

Having selected a set of textual responses, the intelligent-text-insight system feeds the set of textual responses to the text-quality classifier to generate textual quality scores. To generate such scores, the intelligent-text-insight system optionally trains a text-quality classifier—such as a decision-tree classifier or a neural-network classifier—to generate textual quality scores for textual-training responses based on ground-truth-quality scores. Having trained the classifier, the intelligent-text-insight system uses the text-quality classifier to generate a textual quality score for each textual response from a set of textual responses based on textual feature dimensions for each textual response.

In some embodiments, the intelligent-text-insight system uses textual quality scores to sort a set of textual responses. For instance, the intelligent-text-insight system can select textual responses satisfying a textual-quality-score threshold and sort the selected textual responses based on a relevancy parameter for each selected textual response. The intelligent-text-insight system optionally generates such a set of sorted textual responses as a precursor to creating response groups of textual responses.

In addition to sorting textual responses, the intelligent-text-insight system can determine one or both of sentiment indicators and sentiment-polarity indicators for each textual response as a basis for creating response groups. For instance, in some embodiments, the intelligent-text-insight system determines a sentiment score indicating a positive sentiment or a negative sentiment for each extracted sentence. The intelligent-text-insight system can further determine a sentiment-polarity indicator based on the sentiment score for each textual response satisfying (or not satisfying) a positive-sentiment-score threshold or a negative-sentiment-score threshold.

In certain implementations, the intelligent-text-insight system generates response groups of textual responses based on the sentiment score, the sentiment-polarity indicator, and the topic for each textual response. Such response groups may include, for instance, a first response group of textual responses corresponding to a first range of sentiment scores and a second response group of textual responses corresponding to a second range of sentiment scores. Accordingly, response groups may correspond to positive or negative sentiment scores within a defined range.

As noted above, in certain implementations, the intelligent-text-insight system selects representative-textual responses from response groups of textual responses for display within a graphical user interface. For instance, in some embodiments, the intelligent-text-insight system selects first and second representative-textual responses respectively from first and second response groups based on a textual quality score and relevancy parameter for each textual response within their respective response groups.

As suggested above, the intelligent-text-insight system overcomes several technical deficiencies that hinder conventional comment-review systems. First, the intelligent-text-insight system introduces new analysis functions and graphical user interfaces that efficiently present machine-learning-customized snapshots of textual responses. By using a response-extraction-neural network to extract (and sometimes paraphrase) sentences from textual responses—and by relying on computational sentiment analysis—the intelligent-text-insight system generates a response summary that captures common sentiments expressed in a set of textual responses. Such a response summary avoids conventional application of the algorithmic filters for purchase verification, views, or user votes that can obscure common sentiments in conventional comment-review systems. Rather than burying recurrent ideas found in a set of textual responses, the intelligent-text-insight system employs an ordered algorithm of machine learning and sentiment analysis to surface common concepts from textual responses in a concise summary.

In addition to a response summary, in some embodiments, the intelligent-text-insight system generates representative-textual responses from a group of textual responses by employing machine-learning classification and sentiment indicators corresponding to a set of textual responses. In contrast to the outlier comments from conventional comment-review systems, the intelligent-text-insight system uses machine learning to select representative-textual responses that capture common complaints, common praise, and other common concepts expressed in a subset of textual responses. By applying a machine-learning classifier and computational sentiment analysis, in certain implementations, the intelligent-text-insight system can form response groups corresponding to different positive and negative sentiments and display verbatim representative-textual responses from such response groups.

Second, the intelligent-text-insight system improves the efficiency and flexibility with which a comment-review system displays textual responses. As noted above, some conventional comment-review systems limit search or display of textual comments to keyword searches or answers to frequently answered questions. Rather than limiting textual responses by keyword search or FAQs, in some embodiments, the intelligent-text-insight system introduces an efficient and flexible analysis of textual responses to surface concise representations of such responses by time period or topic. In response to a query by time period or topic, for instance, the intelligent-text-insight system can apply machine-learning techniques to return one or both of a response summary and representative-textual responses for an entire body of textual responses—according to the queried time period or queried topic. In some embodiments, the intelligent-text-insight system can also generate a summary comparison of different response summaries corresponding to different time periods to indicate changes over time in textual responses (e.g., in response to a particular survey question).

In addition to efficient and flexible queries by time period or topic, the intelligent-text-insight system further streamlines or simplifies user experience with consolidated graphical user interfaces. In contrast to some conventional comment-review systems that funnel users through multiple selectable options and user interfaces, the intelligent-text-insight system provides graphical user interfaces comprising response summaries or representative-textual responses that consolidate or surface frequently expressed issues from textual responses. Such consolidated summaries and representative-textual responses eliminate excess navigation through user interfaces.

Third, the intelligent-text-insight system can automate a process of summarizing textual responses or surfacing representative-textual responses that computing systems previously could not perform. As suggested above, conventional comment-review systems lack the technical capability of automatically summarizing textual responses or surfacing representative-textual responses. In the absence of such technical capabilities, human analysts often review textual responses in what can be a labor-intensive and expensive process that often produces inaccurate or inconsistent summaries or representative responses. In some cases, the volume of textual responses is practically impossible for humans to accurately or consistently analyze. The intelligent-text-insight system obviates such human review by employing an algorithm involving machine learners and computational sentiment analysis to capture common concepts from textual responses in a concise summary or in representative-textual responses selected for display to a user.

Turning now to the figures, FIG. 1 illustrates a block diagram of a system environment ("environment") 100 in which a digital survey system 104 and an intelligent-text-insight system 106 operate in accordance with one or more embodiments. As illustrated in FIG. 1, the environment 100 includes server device(s) 102, an administrator device 108, and recipient devices 114a-114n, where the server device(s) 102 include the digital survey system 104. As shown in FIG. 1, the digital survey system 104 comprises the intelligent-text-insight system 106. Each of the administrator device 108 and the recipient devices 114a-114n are associated with a type of user. An administrator 112 is associated with the administrator device 108 and uses the administrator device 108 to manage the creation and distribution of a digital survey or review of textual responses. Recipients 108a-108n are respectively associated with the recipient devices 114a-114n and use the recipient devices 114a-114n to provide textual responses (e.g., to a digital survey question).

In some embodiments, the administrator device 108 and the recipient devices 114a-114n communicate with server device(s) 102 over a network 120. As described below, the server device(s) 102 can enable the various functions, features, processes, methods, and systems described herein using, for example, the intelligent-text-insight system 106. As shown in FIG. 1, the intelligent-text-insight system 106 comprises computer executable instructions that, when executed by a processor of the server device(s) 102, perform certain actions described below with reference to FIGS. 2-9. Additionally, or alternatively, in some embodiments, the server device(s) 102 coordinate with one or both of the administrator device 108 and the recipient devices 114a-114n to perform or provide the various functions, features, processes, methods, and systems described in more detail below. Although FIG. 1 illustrates a particular arrangement of the server device(s) 102, the administrator device 108, the recipient devices 114a-114n, and the network 120, various additional arrangements are possible. For example, the server device(s) 102 and the digital survey system 104 may directly communicate with the administrator device 108, bypassing the network 120.

Generally, the administrator device 108 and recipient devices 114a-114n may be any one of various types of client devices. For example, the administrator device 108 and recipient devices 114a-114n may be mobile devices (e.g., a smart phone, tablet), laptops, desktops, or any other type of computing devices, such as those described below with reference to FIG. 10. Additionally, the server device(s) 102 may include one or more computing devices, including those explained below with reference to FIG. 10. The server device(s) 102, the administrator device 108, and the recipient devices 114a-114n may communicate using any communication platforms and technologies suitable for transporting data and/or communication signals, including the examples described below with reference to FIG. 11.

To access the functionalities of the intelligent-text-insight system 106, in certain embodiments, the administrator 112 interacts with an administrator application 110 on the administrator device 108. Similarly, to access digital surveys, compose textual responses, or other functions of the digital survey system 104, in some implementations, the recipients 108a-108n interact with digital response applications 116a-116n, respectively. In some embodiments, one or both of the administrator application 110 and the digital response applications 116a-116n comprise web browsers, applets, or other software applications (e.g., native applications or web applications) available to the administrator device 108 or the recipient devices 114a-114n, respectively. Additionally, in some instances, the digital survey system 104 provides data packets including instructions that, when executed by the administrator device 108 or the recipient devices 114a-114n, create or otherwise integrate the administrator application 110 or the digital response applications 116a-116n within an application or webpage for the administrator device 108 or the recipient devices 114a-114n, respectively.

As an initial overview, the server device(s) 102 provide the administrator device 108 access to the digital survey system 104 and the intelligent-text-insight system 106 by way of the network 120. In one or more embodiments, by accessing the digital survey system 104, the server device(s) 102 provide one or more digital documents to the administrator device 108 to enable the administrator 112 to compose a digital survey. For example, the digital survey system 104 can include a website (e.g., one or more webpages) or utilize the administrator application 110 to enable the administrator 112 to create a digital survey or other digital content for distribution to the recipient devices 114a-114n.

In some cases, the administrator device 108 launches the administrator application 110 to facilitate interacting with the digital survey system 104 or its constituent intelligent-text-insight system 106. The administrator application 110 may coordinate communications between the administrator device 108 and the server device(s) 102 that ultimately result in the creation of a digital survey or other digital content that the digital survey system 104 distributes to one or more of the recipient devices 114a-114n. For instance, to facilitate the creation of a digital survey, the administrator application 110 can provide graphical user interfaces of the digital survey system 104, receive indications of interactions from the administrator 112 with the administrator device 108, and cause the administrator device 108 to communicate user input based on the detected interactions to the digital survey system 104, such as communicating a textual response.

Figure 2:
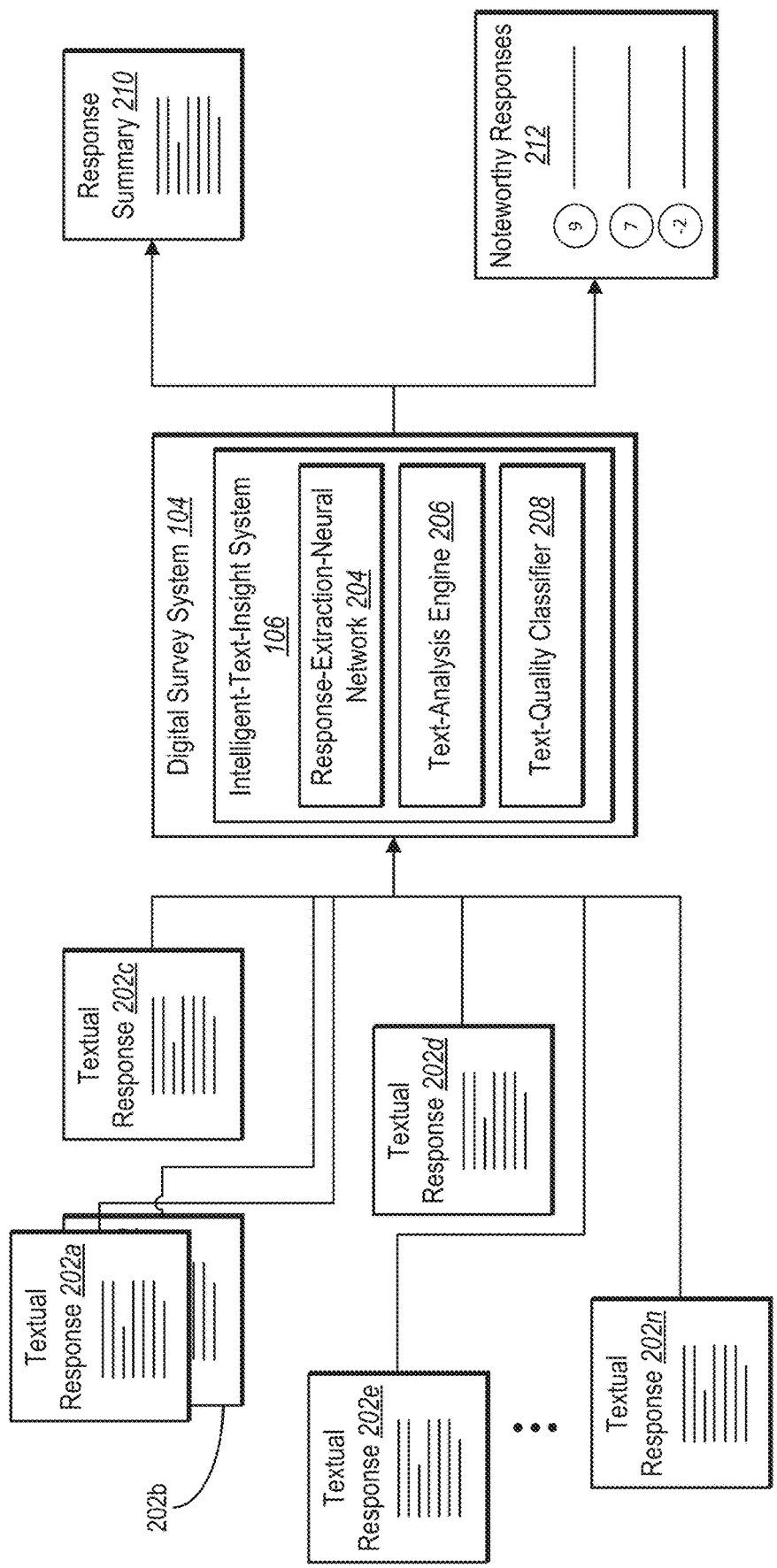
FIG. 2 illustrates a conceptual diagram of an intelligent-text-insight system applying machine-learning techniques and computational sentiment analysis to generate a response summary and to select representative-textual responses from a set of textual responses in accordance with one or more embodiments.

As noted above, the intelligent-text-insight system 106 can apply machine-learning techniques and computational sentiment analysis to summarize sentences extracted from a group of textual responses or to select representative-textual responses from the group of textual responses. FIG. 2 provides a brief example of one such embodiment of the intelligent-text-insight system 106. In particular, FIG. 2 illustrates the intelligent-text-insight system 106 applying a response-extraction-neural network 204 and computational sentiment analysis to generate a response summary 210 for a set of textual responses. FIG. 2 further illustrates the intelligent-text-insight system 106 applying a text-quality classifier 208 and computational sentiment analysis to select representative-textual responses 212 from a set of textual responses.

As shown in FIG. 2, the digital survey system 104 receives textual responses 202a-202n from recipient devices. As used in this disclosure, the term "textual response" refers to a text that forms one or more statements or questions. In particular, a textual response includes one or more sentences of human-readable characters responding to a survey question, digital posting, digital message, or other digital content. For example, a textual response can include sentences composed by a respondent in response to a survey question distributed by the digital survey system 104. As a further example, a textual response can include sentences composed by a respondent in an email, a digital or online posting, a text message, or other digital message responding to another email, digital or online posting, text message, or other digital message.

After receiving the textual responses 202a-202n, the intelligent-text-insight system 106 selects (from the textual responses 202a-202n) a set of textual responses to provide to a response-extraction-neural network 204. For instance, the intelligent-text-insight system 106 may select textual responses responding to a survey question based on one or both of a relevance to a query and recency of textual response.

As used in this disclosure, the term "response-extraction-neural network" refers to an artificial neural network that selects sentences from textual responses based on characteristics of each textual response. In particular, in certain implementations, a response-extraction-neural network refers to an artificial neural network that extracts selected sentences from textual responses and paraphrases the extracted sentences. A response-extraction-neural network can comprise one or more encoders and one or more decoders, such as an encoder-decoder-neural network or encoders and decoders part of (or used in conjunction with) a convolutional neural network ("CNN") or recurrent neural network ("RNN"). As explained further below, in some cases, a response-extraction-neural network includes both an extractor-selection network for extracting selected sentences and an abstractor network for paraphrasing the selected sentences.

Relatedly, the term "extracted sentence" refers to a sentence extracted from (or identified within) a textual response. In particular, in some embodiments, an extracted sentence refers to a complete or incomplete sentence selected by a response-extraction-neural network from a textual response. In some such cases, the response-extraction-neural network selects sentences from textual responses based on relevance to a query. For example, the intelligent-text-insight system 106 may use the response-extraction-neural network 204 to generate a set of extracted sentences from a set of textual responses, where each extracted sentence corresponds to a sentence selected by the response-extraction-neural network 204 from the textual responses 202a-202n.

Upon generating a set of extracted sentences, the intelligent-text-insight system 106 inputs each extracted sentence from the set into a text-analysis engine 206 to determine a sentiment indicator for each extracted sentence. As used in this disclosure, the term "sentiment indicator" refers to a field, label, score, or other indication of a linguistic sentiment. In particular, in some embodiments, a sentiment indicator refers to a sentiment label or sentiment score determined by computational sentiment analysis for a textual response or a sentence. Such computational sentiment analysis can include lexicon-based sentiment analysis (also known as knowledge-based sentiment analysis) or statistical-based sentiment analysis.

When the text-analysis engine 206 analyzes an extracted sentence, for example, the text-analysis engine 206 can determine a sentiment label of positive, negative, neutral, or mixed for each extracted sentence. Additionally, or alternatively, the text-analysis engine 206 can determine a sentiment score for each extracted sentence (e.g., a sentiment score between −10 and 10). In some embodiments, such a sentiment score indicates a positive or negative sentiment of the extracted sentence. Based on the sentiment indicators, the intelligent-text-insight system 106 can sort the set of extracted sentences (e.g., accordingly to polarity of sentiment scores or ranges of sentiment scores).

Based on a sorted set of extracted sentences, the intelligent-text-insight system 106 generates clusters of extracted sentences corresponding to different contexts. As used in this disclosure, the term "cluster of extracted sentences" refers to a grouping of extracted sentences that correspond to a linguistic context. In particular, in some embodiments, a cluster of extracted sentences refers to a grouping of extracted sentences that correspond to a linguistic context embedding. In some cases, a cluster of extracted sentences further corresponds to a range of (or specific) positive or negative sentiment scores.

Relatedly, the term "context" refers to a set of linguistic characteristics surrounding a word, phrase, or sentence. In particular, in some embodiments, a context refers to a linguistic context embedding for a word, phrase, or sentence. For example, in some embodiments, a linguistic context embedding includes a word embedding or a sentence embedding for an extracted sentence. When a grouping of extracted sentences most closely correspond to a particular context or to a linguistic context embedding, the grouping of extracted sentences form a cluster of extracted sentences.

After generating clusters of extracted sentences, the intelligent-text-insight system 106 selects one or more extracted sentences from each cluster or from some of the clusters. For example, in some embodiments, the intelligent-text-insight system 106 selects a first extracted sentence from a first cluster of extracted sentences and a second extracted sentence from a second cluster of extracted sentences. As indicated by FIG. 2, the intelligent-text-insight system 106 subsequently generates the response summary 210 for a set of textual responses based on extracted sentences selected from clusters of extracted sentences.

As used in this disclosure, the term "response summary" refers to a synopsis of a set of textual responses. In particular, a response summary includes a compressed paraphrasing of extracted sentences from a set of textual responses. In some embodiments, for instance, a response summary may paraphrase textual responses that respond to a particular survey question (e.g., a plain language summary of respondents' written responses to a common survey question). Additionally, or alternatively, a response summary may paraphrase textual responses concerning a particular topic (e.g., a product or service). A response summary can come in the form of a plain language representation of an underlying set of textual responses and look itself as a textual response. By contrast, a response summary can also come in the form of an executive summary describing common issues in an underlying set of textual responses.

As further shown in FIG. 2, in some embodiments, the intelligent-text-insight system 106 applies the text-quality classifier 208 and computational sentiment analysis to select representative-textual responses 212 from a set of textual responses. Similar to the initial selection process above, after receiving the textual responses 202a-202n, the intelligent-text-insight system 106 selects from the textual responses 202a-202n a set of textual responses to provide to the text-quality classifier 208. For instance, the intelligent-text-insight system 106 may select a set of textual responses responding to a digital survey based on one or both of a relevance of textual responses to a query and recency of response. The text-quality classifier 208 subsequently generates a textual quality score for each textual response from the set of textual responses.

As used in this disclosure, the term "text-quality classifier" refers to a machine-learning classifier that classifies textual responses by determining a score indicating a quality of the writing of the textual response. In particular, in certain implementations, a text-quality classifier refers to a decision-tree classifier or a neural-network classifier that generates scores classifying a quality of a textual response's writing based on textual feature dimensions for (or corresponding to) the textual response. For example, a text-quality classifier may include a linear regression, multi-layered perceptron, random-forest classifier, or support vector machine ("SVM"). By contrast, a text-quality classifier may include a CNN or RNN.

Relatedly, the term "textual quality score" refers to a score indicating a quality of writing in a textual response based on linguistic or textual features of the textual response. In particular, in some embodiments, a textual quality score refers to a score indicating a quality of a textual response's writing based on textual features extracted from the textual response. Such textual features may reflect, but are not limited to, readability indices, response composition, speech composition, coherence, point-of-view identification, and suggestion identification of a textual response.

In addition to generating a textual quality score, the intelligent-text-insight system 106 provides each textual response to the text-analysis engine 206 to determine a relevancy parameter, a sentiment indicator, and a topic for each textual response from the set of textual responses. As used in this disclosure, the term "relevancy parameter" refers to a parameter indicating a relevance of a textual response to a query. For instance, a relevancy parameter may refer to a topic-similarity score indicating a relevance of a textual response to a topic query. Such a topic-similarity score may be, for instance, a Lucene search-engine score based on search terms in a topic query, such as a score determined by a function of a normalized term frequency-inverse document frequency ("TF-IDF"). As a further example, a topic-similarity score may include a similarity measure of a vector representation of a text of the textual response and a topic query, where the similarity measure is based on various similarity measures, such as cosine similarity.

Additionally, or alternatively, a relevancy parameter may refer to (or include) a recency of a textual response according to a time at which the textual response was sent or received. As a further example, a relevancy parameter may refer to (or include) a similarity between a text of a textual response and a corresponding question prompting the textual response. In some embodiments, a relevancy parameter includes any combination of a topic-similarity score, a recency of a textual response, and a similarity between a textual response and a prompting question.

Relatedly, the term "topic" refers to a subject matter of a textual response. In particular, in some embodiments, a topic includes a topic identifier or tag indicating a subject matter of a textual response applied to the textual response by a human reviewer or by a computer (e.g., based on a topic of a survey question or based on natural language analysis). In some such embodiments, a computer automatically applies a topic tag or topic identifier to a textual response or constituent sentence based on frequency of a term or a synonym for a term within a textual response or within a particular sentence.

After determining sentiment indicators and topics, the intelligent-text-insight system 106 generates response groups of textual responses from the set of textual responses based on one or both of the sentiment indicator and the topic for each textual response. As used in this disclosure, the term "response group" refers to a grouping of textual responses at least according to sentiment indicators. In particular, in some embodiments, the term response group refers to a grouping of textual responses by one or both of (i) sentiment indicator or range of sentiment scores and (ii) topic. Accordingly, in some embodiments, a response group of textual response includes textual responses corresponding to a particular range of sentiment scores or corresponding to a positive sentiment indicator, a negative sentiment indicator, a neutral sentiment indicator, or a mixed sentiment indicator. Such a response group of textual responses may further be segmented according to topic.

As indicated by FIG. 2, in addition to generating response groups of textual responses, the intelligent-text-insight system 106 selects the representative-textual responses 212 from such response groups for display on a client device. In some cases, the intelligent-text-insight system 106 selects a representative-textual response of the representative-textual responses 212 based in part on the relevancy parameter for each textual response within a response group. As used herein, the term "representative-textual response" refers to a textual response indicative or representative of a subset of textual responses. In particular, in some embodiments, the term representative-textual response refers to a textual response expressing concepts or issues commonly found in a response group of textual responses. For instance, a representative-textual response may capture a commonly expressed complaint, praise, or other concept in a response group corresponding to a positive, mixed, neutral, or negative sentiment.

As further indicated in FIG. 2, in some embodiments, the intelligent-text-insight system 106 generates the response summary 210 and the representative-textual responses 212 for a same set of textual responses. By providing both the response summary 210 and the representative-textual responses 212, the intelligent-text-insight system 106 can provide two different types of concise snapshots of a set of textual responses within a single user interface.

Figure 3A:
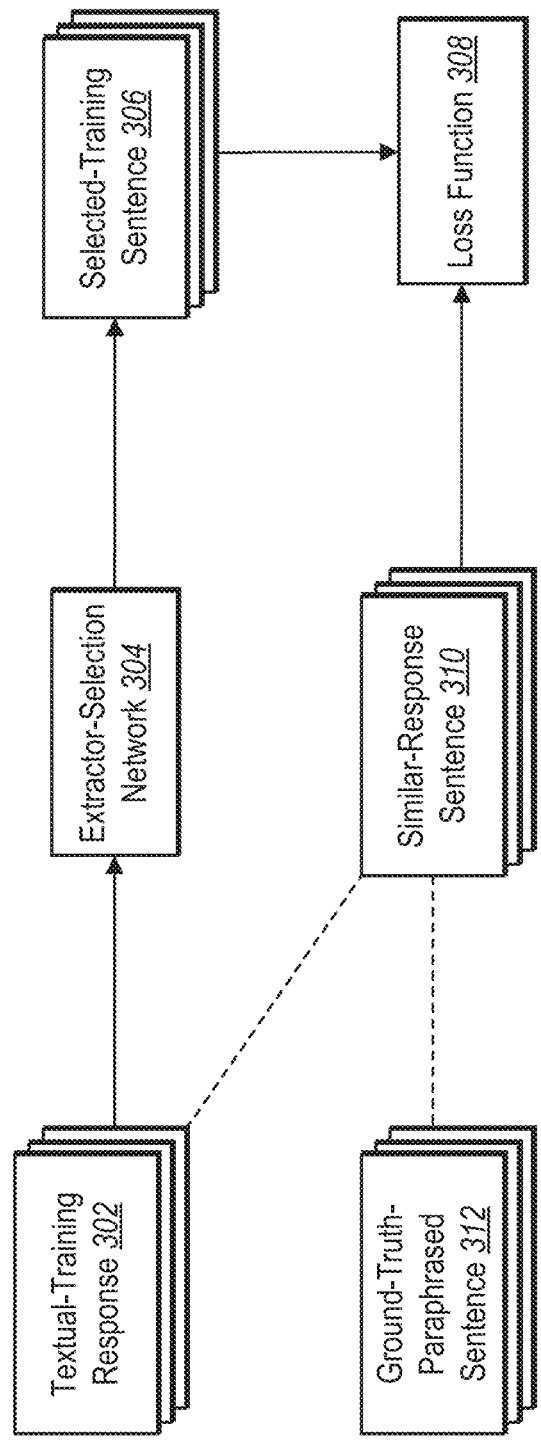
FIG. 3A illustrates an intelligent-text-insight system training an extractor-selection network to select training sentences from textual-training responses based on similar-response sentences and ground-truth-paraphrased sentences in accordance with one or more embodiments.
Figure 3B:
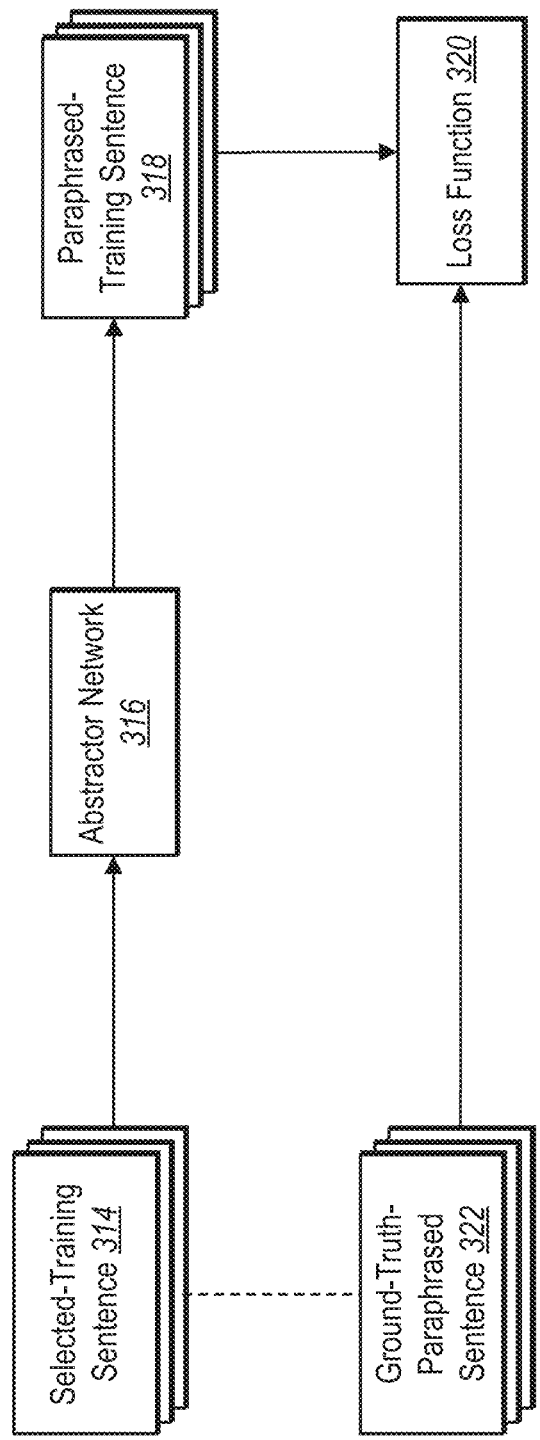
FIG. 3B illustrates an intelligent-text-insight system training an abstractor network to paraphrase selected-training sentences based on ground-truth-paraphrased sentences in accordance with one or more embodiments.
Figure 3C:
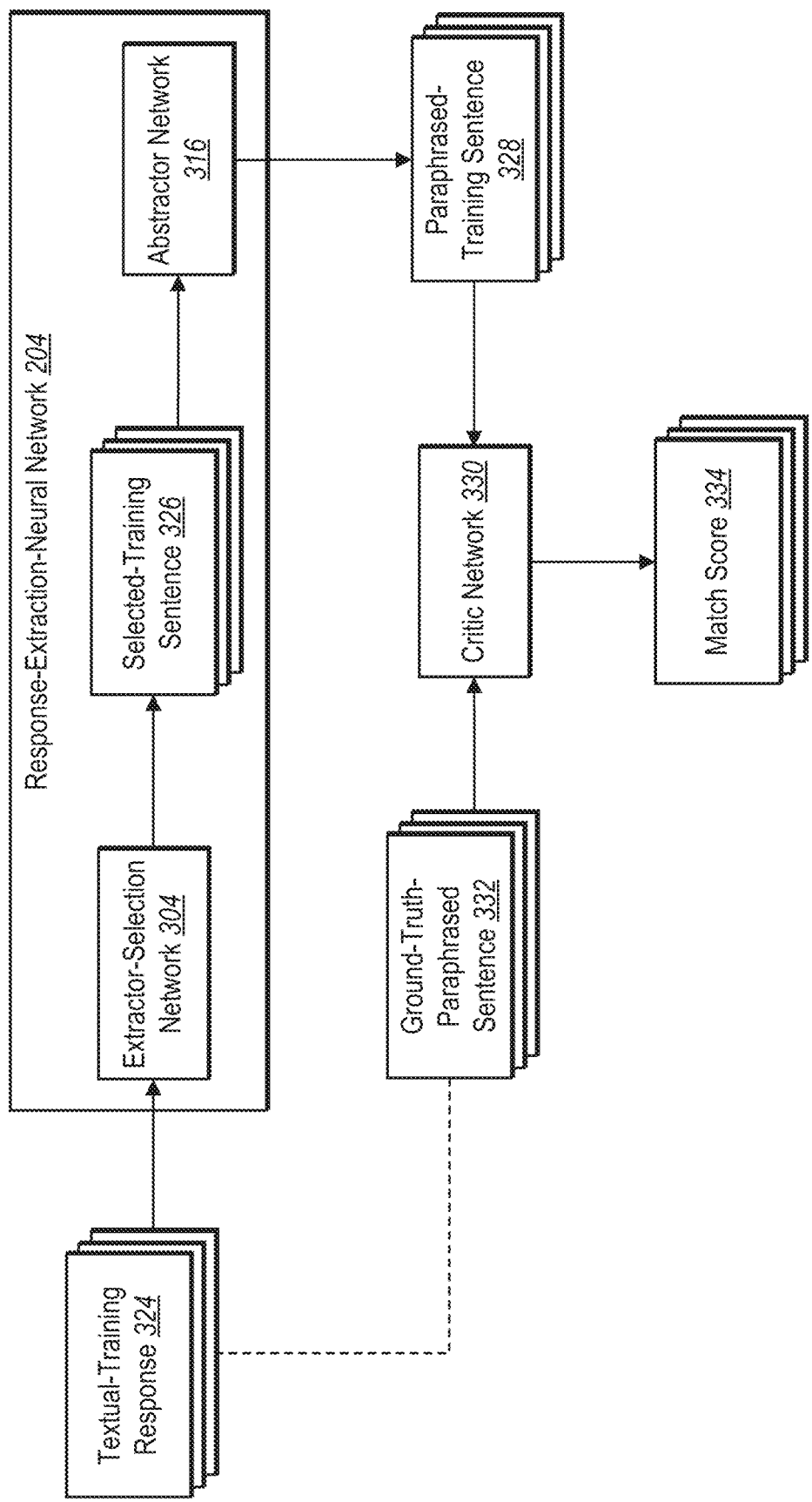
FIG. 3C illustrates an intelligent-text-insight system training an extractor-selection network and an abstractor network to paraphrase selected-training sentences based on ground-truth-paraphrased sentences in accordance with one or more embodiments.

As suggested above, in some embodiments, the intelligent-text-insight system 106 trains one or both of an extractor-selection network and an abstractor network of the response-extraction-neural network 204. FIGS. 3A-3C depict examples of such training. As an overview, FIG. 3A illustrates the intelligent-text-insight system 106 training an extractor-selection network 304 of the response-extraction-neural network 204 to extract selected sentences. FIG. 3B illustrates intelligent-text-insight system 106 training an abstractor network 316 of the response-extraction-neural network 204 to paraphrase selected sentences. FIG. 3C illustrates the intelligent-text-insight system 106 using reinforced learning to train the extractor-selection network 304 and the abstractor network 316 with a critic network 330 to paraphrase selected sentences.

As shown in FIG. 3A, the intelligent-text-insight system 106 iteratively provides textual-training responses to the extractor-selection network 304 to extract selected-training sentences from corresponding textual-training responses. In each training iteration, the intelligent-text-insight system 106 determines a loss from a loss function 308 based on a comparison of a selected-training sentence and a similar-response sentence, where the similar-response sentence corresponds to a ground-truth-paraphrased sentence. The intelligent-text-insight system 106 subsequently adjusts network parameters of the extractor-selection network 304 based on the determined loss. The intelligent-text-insight system 106 then inputs a further textual-training response into the extractor-selection network 304 as part of a subsequent training iteration.

In an initial training iteration, for example, the intelligent-text-insight system 106 inputs a textual-training response 302 into the extractor-selection network 304. As part of such input, in some embodiments, the intelligent-text-insight system 106 parses and tokenizes the textual-training response 302 into a list of response sentences. The intelligent-text-insight system 106 subsequently inputs the list of response sentences (or each response sentence) from the textual-training response 302 into the extractor-selection network 304.

As used in this disclosure, the term "textual-training response" refers to a textual response used for training a response-extraction-neural network. In some embodiments, a textual-training response includes an email, a digital or online posting, a text message, or other digital message. By contrast, in certain implementations, a textual-training response includes published or publicly available written content, such as a news article, academic article, or industry publication corresponding to (or including) a written abstract or summary of the article or publication.

The term "extractor-selection network" refers to an artificial neural network that is part of (or constitutes) a response-extraction-neural network and that extracts selected sentences from textual responses. In some embodiments, an extractor-selection network comprises one or more encoders and one or more decoders, such as an encoder-decoder-neural network or encoders and decoders part of (or used in conjunction with) an RNN. For example, an extractor-selection network may include a convolutional sentence encoder, an RNN that acts as an encoder, and an RNN that acts as a decoder. In some such embodiments, the extractor-selection network comprises the convolutional sentence encoder and long-short-term memory ("LSTM") layered RNNs of an extractor agent described by Yen-Chun Chen and Mohit Bansal, "Fast Abstractive Summarization with Reinforce-Selected Sentence Rewriting," *Proceedings of the 56th Annual Meeting of the Association for Computational Linguistics*, pp. 675-686 (2018) (hereinafter "Chen"), the entire contents of which are hereby incorporated by reference.

Upon receiving the textual-training response 302, the extractor-selection network 304 extracts a selected-training sentence 306 from the textual-training response 302. The term "selected-training sentence" refers to a response sentence selected and extracted from a textual response during training of a response-extraction-neural network. In some embodiments, for instance, the extractor-selection network 304 determines an encoded representation and a context-aware representation for each sentence within the textual-training response 302. Based on the representation and context-aware representation for each sentence, the extractor-selection network 304 selects and extracts the selected-training sentence 306 from the textual-training response 302. In some such cases, a selected-training sentence, encoded representation, and context-aware representation respectively correspond to the symbols $j_t$, $r_j$, and $h_j$ described in Chen.

As further indicated in FIG. 3A, the intelligent-text-insight system 106 determines a loss from the loss function 308 based on a comparison of the selected-training sentence 306 and a similar-response sentence 310. As used in this disclosure, the term "similar-response sentence" refers to a response sentence from a textual-training response that is similar to a ground-truth-paraphrased sentence. In particular, in some embodiments, a similar-response sentence refers to a response sentence from a textual-training response that is most similar to a ground-truth-paraphrased sentence from a ground-truth summary. In such cases, the intelligent-text-insight system 106 identifies a most similar response sentence based on individual sentence scores for each sentence in the textual-training response and the ground-truth summary. For instance, the intelligent-text-insight system 106 may determine scores for each sentence in textual-training responses—and for each sentence in ground-truth summaries of the textual-training responses—as a basis for identifying a similar-response sentence. In some cases, a similar-response sentence represents the most similar document sentence $d_{jt}$, as described in Chen.

As just indicated, the concept of a similar-response sentence relates to a ground-truth summary and a ground-truth-paraphrased sentence. The term "ground-truth summary" refers to an empirically observed or human-written abstract or summary of a textual-training response. For example, a ground-truth summary may include a summary of a written survey response prepared by a human or analyst. As a further example, a ground-truth summary may include a written abstract for a news article, academic article, or industry publication. The term "ground-truth-paraphrased sentence" refers to a sentence from a ground-truth summary. Continuing the examples from above, a ground-truth-paraphrased sentence may be a sentence from a written summary of a survey response or a sentence from a written abstract for an article. When training the extractor-selection network 304, in some embodiments, the intelligent-text-insight system 106 uses a ground-truth-paraphrased sentence as a reference point for a similar-response sentence, the latter of which the intelligent-text-insight system 106 compares to a selected-training sentence in the loss function 308.

As indicated by FIG. 3A, the intelligent-text-insight system 106 may use a cross-entropy-loss function to compare the selected-training sentence 306 and the similar-response sentence 310 and to determine a loss. In the alternative to a cross-entropy-loss function, in some embodiments, the intelligent-text-insight system 106 uses an L2-loss function, mean-absolute-error-loss function, a mean-squared-error-loss function, a root-mean-squared-error function, or other suitable loss function as the loss function 308.

Upon determining a loss from the loss function 308, the intelligent-text-insight system 106 adjusts network parameters (e.g., weights or values) of the extractor-selection network 304 to decrease a loss for the loss function 308 in a subsequent training iteration. For example, the intelligent-text-insight system 106 may increase or decrease weights or values of the extractor-selection network 304 to minimize the loss in a subsequent training iteration.

As suggested by FIG. 3A, after adjusting network parameters of the extractor-selection network 304 for an initial training iteration, the intelligent-text-insight system 106 performs additional training iterations until satisfying a convergence criteria. For instance, the intelligent-text-insight system 106 iteratively provides textual-training responses to the extractor-selection network 304 to extract selected-training sentences, iteratively determines losses from the loss function 308 based on comparisons of the selected-training sentences and similar-response sentences, and iteratively adjusts network parameters of the extractor-selection network 304 based on the determined losses. In some cases, the intelligent-text-insight system 106 performs training iterations until the value or weights of the extractor-selection network 304 do not change significantly across training iterations.

Turning back now to FIG. 3B, as shown in this figure, the intelligent-text-insight system 106 iteratively provides selected-training sentences to the abstractor network 316 to generate paraphrased-training sentences. In each training iteration, the intelligent-text-insight system 106 further determines a loss from a loss function 320 based on a comparison of a paraphrased-training sentence and a ground-truth paraphrased sentence, where the ground-truth paraphrased sentence comes from a ground-truth summary. The intelligent-text-insight system 106 subsequently adjusts network parameters of the abstractor network 316 based on the determined loss. The intelligent-text-insight system 106 then inputs a further selected-training sentence into the abstractor network 316 as part of a subsequent training iteration.

In an initial iteration, for example, the intelligent-text-insight system 106 inputs a selected-training sentence 314 into the abstractor network 316. In some embodiments, the selected-training sentence 314 is the selected-training sentence 306 output by the extractor-selection network 304. As used in this disclosure, the term "abstractor network" refers to an artificial neural network that paraphrases sentences selected from textual responses. In some embodiments, an abstractor network comprises an encoder and a decoder, such as an encoder-decoder-neural network or a bidirectional RNN comprising an RNN encoder and an RNN decoder. For example, an abstractor network may include an RNN encoder and an RNN decoder with a feedforward neural network that aligns sentences from the RNN encoder to the RNN decoder. In some such embodiments, the abstractor network comprises the encoder-aligner-decoder described by Chen or the architecture of the bidirectional RNN and alignment model described by Dzmitry Bandanau et al., "Neural Machine translation by jointly Learning to Align and Translate," *International Conference on Learning Representations* (2015) (hereinafter "Bandanau"), the entire contents of which are hereby incorporated by reference.

Upon receiving the selected-training sentence 314, the abstractor network 316 compresses and paraphrases the selected-training sentence to generate a paraphrased-training sentence 318. The term "paraphrased-training sentence" refers to a response sentence compressed or summarized by a response-extraction-neural network. In particular, in some cases, a paraphrased-training sentence represents a summarized version of a sentence extracted from a textual response.

As further shown in FIG. 3B, the intelligent-text-insight system 106 determines a loss from the loss function 320 based on a comparison of the paraphrased-training sentence 318 and a ground-truth-paraphrased sentence 322. For example, the intelligent-text-insight system 106 may use a cross-entropy-loss function to compare the paraphrased-training sentence 318 and the ground-truth-paraphrased sentence 322 and to determine a loss. In the alternative to a cross-entropy-loss function, in some embodiments, the intelligent-text-insight system 106 uses an L2-loss function, mean-absolute-error-loss function, a mean-squared-error-loss function, or other suitable loss function as the loss function 320.

Upon determining a loss from the loss function 320, the intelligent-text-insight system 106 adjusts network parameters (e.g., weights or values) of the abstractor network 316 to decrease a loss for the loss function 320 in a subsequent training iteration. For example, the intelligent-text-insight system 106 may increase or decrease weights or values of the abstractor network 316 to decrease the loss in a subsequent training iteration.

As suggested by FIG. 3B, after adjusting network parameters of the abstractor network 316 for an initial training iteration, the intelligent-text-insight system 106 performs additional training iterations until satisfying a convergence criteria. For instance, the intelligent-text-insight system 106 iteratively provides selected-training sentences to the abstractor network 316 to generate paraphrased-training sentences, iteratively determines losses from the loss function 320 based on comparisons of the paraphrased-training sentences and ground-truth-paraphrased sentences, and iteratively adjusts network parameters of the abstractor network 316 based on the determined losses. In some cases, the intelligent-text-insight system 106 performs training iterations until the value or weights of the abstractor network 316 do not change significantly across training iterations.

As noted above, the intelligent-text-insight system 106 optionally trains the extractor-selection network 304 and the abstractor network 316 together using reinforced learning. FIG. 3C illustrates an example of one such reinforced learning model. In particular, FIG. 3C depicts the intelligent-text-insight system 106 using the critic network 330 to train the extractor-selection network 304 and the abstractor network 316 within the response-extraction-neural network to paraphrase selected sentences.

In an initial iteration, for example, the intelligent-text-insight system 106 inputs a textual-training response 324 into the extractor-selection network 304 to generate a selected-training sentence 326 as an input for the abstractor network 316. Upon receipt, the abstractor network 316 subsequently generates a paraphrased-training sentence 328 for the selected-training sentence 326. The intelligent-text-insight system 106 further inputs the paraphrased-training sentence 328 and a ground-truth-paraphrased sentence 332 into the critic network 330. The critic network 330 subsequently generates a match score 334 indicating a degree to which the paraphrased-training sentence 328 matches or resembles the ground-truth-paraphrased sentence 332. The intelligent-text-insight system 106 further adjusts network parameters of one or both of the extractor-selection network 304 and the abstractor network 316 based on the match score 334.

As used in this disclosure, the term "critic network" refers to a machine learner that determines or evaluates a degree to which a paraphrased-training sentence resembles a ground-truth-paraphrased sentence. In some embodiments, a critic network constitutes an Actor Advantage Critic ("A2C") model that implements a policy gradient. To implement such a policy gradient in a given training iteration, the critic network 330 optionally observes a current state $c_t$ of a textual-training response and its constituent sentences, samples a paraphrased-training sentence generated from a selected-training sentence $d_{jt}$, and generates a Recall-Oriented Understudy for Gisting Evaluation ("ROUGE") match score comparing the paraphrased-training sentence to a ground-truth-paraphrased sentence. In some cases, the intelligent-text-insight system 106 uses the critic network and ROUGE-match score described in Chen.

By employing a reinforced learning model, in some embodiments, the critic network 330 uses a match score as a reward. For example, if the extractor-selection network 304 extracts a selected-training sentence relevant to a ground-truth summary—and the abstractor network 316 compresses the relevant selected-training sentence into a paraphrased-training sentence—the critic network 330 generates a ROUGE-match score as a reward indicating a relatively high degree of match between the paraphrased-training sentence and a ground-truth-paraphrased sentence. By contrast, if the extractor-selection network 304 extracts a selected-training sentence irrelevant to the ground-truth summary—and the abstractor network 316 compresses the irrelevant selected-training sentence into a paraphrased-training sentence—the critic network 330 generates a ROUGE-match score as a deterrent indicating a lower degree of match between the paraphrased-training sentence and a ground-truth-paraphrased sentence.

Continuing with the initial training iteration in FIG. 3C, the intelligent-text-insight system 106 uses the critic network 330 to determine a loss based on a comparison of the paraphrased-training sentence 328 and the ground-truth-paraphrased sentence 332. For example, in some embodiments, the critic network 330 determines a squared loss between a baseline critic and a total return of expected rewards in terms of ROUGE-match scores. This total return represents an estimate of rewards from an action-value function (e.g., maximum expected ROUGE-match scores) for extracting selected-training sentences from each observed state (e.g., from each textual-training response). In the initial training iteration, the intelligent-text-insight system 106 adjusts parameters of the critic network 330 to decrease a squared loss in a subsequent training iteration.

As suggested by FIG. 3C, after adjusting network parameters of the response-extraction-neural network 204 and the critic network 330 for an initial training iteration, the intelligent-text-insight system 106 performs additional training iterations until satisfying a convergence criteria. For instance, the intelligent-text-insight system 106 iteratively provides textual-training responses to the response-extraction-neural network 204 to extract selected-training sentences and generate paraphrased-training sentences and iteratively determines match scores based on comparisons of the paraphrased-training sentences and ground-truth-paraphrased sentences. Based on the match scores, the intelligent-text-insight system 106 adjusts network parameters of the response-extraction-neural network 204 and the critic network 330. By performing multiple training iterations, the intelligent-text-insight system 106 trains the critic network 330 to minimize a squared loss.

Figure 3D:
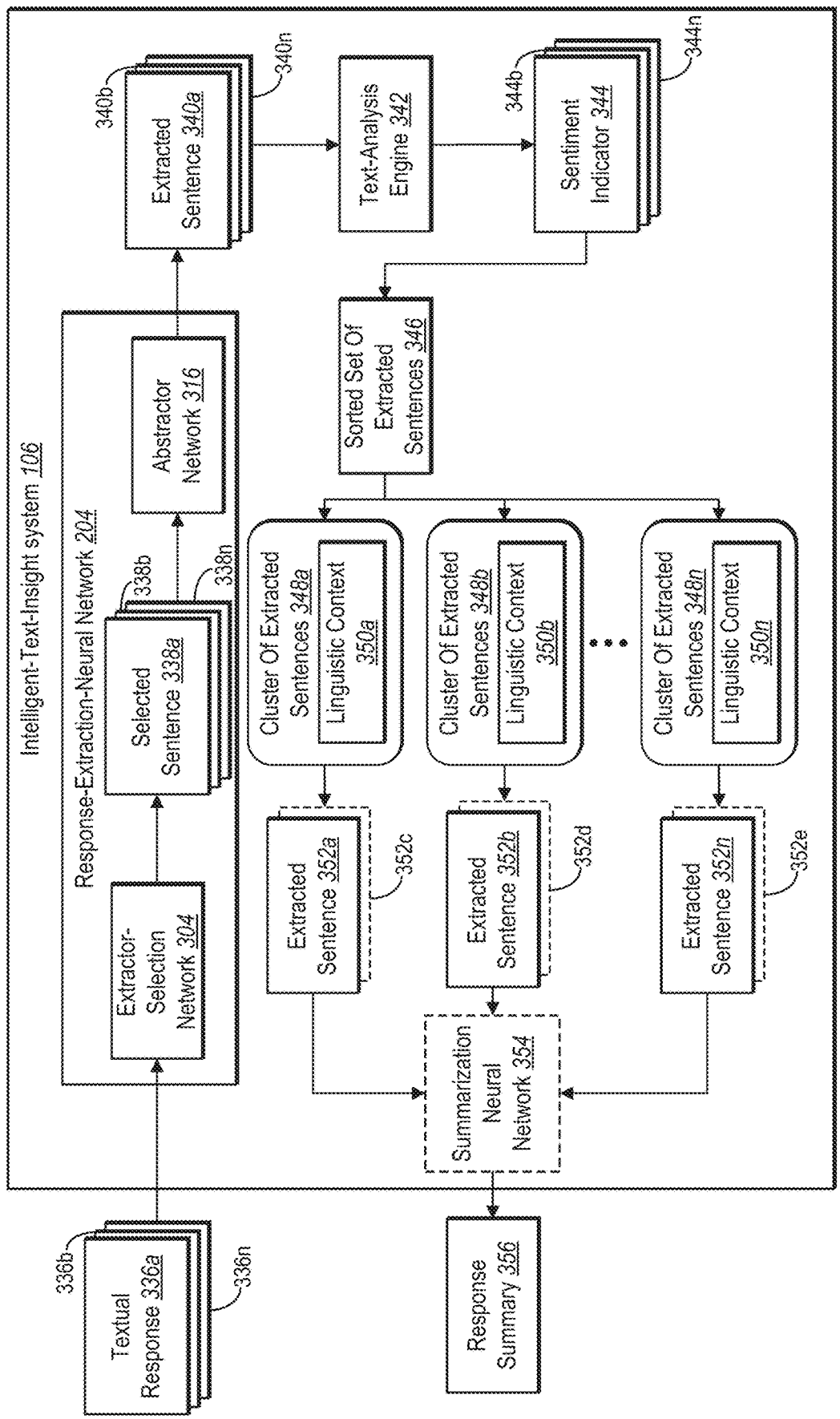
FIG. 3D illustrates an intelligent-text-insight system applying a response-extraction-neural network and computational sentiment analysis to generate a response summary for a set of textual responses in accordance with one or more embodiments.

In addition (or in the alternative) to training the response-extraction-neural network 204, in some embodiments, the intelligent-text-insight system 106 applies the response-extraction-neural network 204 and computational sentiment analysis to generate a response summary for a set of textual responses. FIG. 3D illustrates one such embodiment of the intelligent-text-insight system 106.

As shown in FIG. 3D, the intelligent-text-insight system 106 provides textual responses 336a-336n to the response-extraction-neural network 204 to respectively generate extracted sentences 340a-340n for the textual responses 336a-336n. The intelligent-text-insight system 106 further determines sentiment indicators 344a-344n respectively for the extracted sentences 340a-340n as a basis for sorting the extracted sentences 340a-340n. Based on a sorted set of the extracted sentences 346, the intelligent-text-insight system 106 generates clusters of extracted sentences 348a-348n. Based on extracted sentences 352a, 352b, and 352n from the clusters of extracted sentences 348a, 348b, and 348n, respectively, the intelligent-text-insight system 106 generates a response summary 356 for the textual responses 336a-336n.

As indicated in FIG. 3D, in some embodiments, the intelligent-text-insight system 106 responds to a query by selecting the textual responses 336a-336n as a set of textual responses. In some cases, the intelligent-text-insight system 106 can select the textual responses 336a-336n based on a query searching for textual responses corresponding to a topic or time period. For example, in some embodiments, the intelligent-text-insight system 106 selects the textual responses 336a-336n from a response database based on each textual response's relevance to a topic query and recency in receipt. Such a relevance may be determined by a Lucene search-engine score based on search terms in a topic query, such as a score determined by a function of a normalized TF-IDF. As a further example, in some embodiments, the intelligent-text-insight system 106 selects the textual responses 336a-336n from the response database based on a time identifier for each textual response indicating that the intelligent-text-insight system 106 received (or a recipient device sent) the textual response within a queried time period.

After selecting the textual responses 336a-336n, the intelligent-text-insight system 106 iteratively provides the textual responses 336a-336n to the response-extraction-neural network 204 to respectively generate the extracted sentences 340a-340n for the textual responses 336a-336n. For example, in some embodiments, the intelligent-text-insight system 106 parses and tokenizes the textual response 336a into a list of response sentences. The intelligent-text-insight system 106 subsequently inputs the list of response sentences (or each response sentence) from the textual response 336a into the extractor-selection network 304. Similarly, the intelligent-text-insight system 106 parses and tokenizes each of the remaining textual responses 336b-336n into lists of response sentences for input into the extractor-selection network 304.

Consistent with the disclosure above, in some embodiments, the intelligent-text-insight system 106 iteratively provides the textual responses 336a-336n to the extractor-selection network 304 to respectively generate selected sentences 338a-338n. In some cases, the selected sentences 338a-338n are not paraphrased, but become the extracted sentences 340a-340n. By contrast, in some embodiments, the intelligent-text-insight system 106 iteratively provides the selected sentences 338a-338n to the abstractor network 316 to generate the extracted sentences 340a-340n in paraphrased form.

In addition to (or instead of) applying the response-extraction-neural network 204 to extract sentences from the textual responses 336a-336n, in some embodiments, the intelligent-text-insight system 106 selects sentences from one or more of the textual responses 336a-336n based on topic identifiers or tags associated with such sentences. For example, the intelligent-text-insight system 106 optionally identifies any sentence from the textual responses 336a-336n having a topic identifier or tag that matches a queried topic and selects such sentences for inclusion within the selected sentences 338a-338n.

As further shown in FIG. 3D, in addition to generating the extracted sentences 340a-340n, the intelligent-text-insight system 106 inputs the extracted sentences 340a-340n into a text-analysis engine 342. Among other things, the text-analysis engine 342 performs computational sentiment analysis to determine the sentiment indicators 344a-344n for the extracted sentences 340a-340n, respectively. Such computational sentiment analysis can include lexicon-based sentiment analysis (also known as knowledge-based sentiment analysis) or statistical-based sentiment analysis to determine a sentiment score or a sentiment label for an extracted sentence (e.g., a sentiment score between −10 and 10). As suggested above, in some embodiments, the text-analysis engine 342 determines a sentiment label of positive, negative, neutral, or mixed for each of the extracted sentences 340a-340n based on a corresponding sentiment score.

To perform computational sentiment analysis, the intelligent-text-insight system 106 optionally uses a Pattern Analyzer or a Natural Language Tool Kit ("NLTK") classifier from TextBlob to determine a sentiment score for each extracted sentence. As a further example, in some embodiments, the intelligent-text-insight system 106 determines sentiment scores as described by Maite Taboada et al., "Lexicon-Based Methods for Sentiment Analysis," 37 *Computational Linguistics* 272-274 (2011), the entire contents of which are hereby incorporated by reference.

As suggested above, in some embodiments, the text-analysis engine 342 determines the sentiment indicators 344a-344n for specific topics. For example, upon receiving a query searching for textual responses by topic, the intelligent-text-insight system 106 determines a sentiment indicator for each of the extracted sentences 340a-340n according to the queried topic. Accordingly, the text-analysis engine 342 may determine multiple sentiment indicators for a single extracted sentence corresponding to different topics.

As further shown in FIG. 3D, the intelligent-text-insight system 106 sorts the extracted sentences 340a-340n into a sorted set of extracted sentences 346 based on the sentiment indicators 344a-344n. When generating the sorted set of extracted sentences 346, the intelligent-text-insight system 106 optionally selects (i) one or more subsets of extracted sentences corresponding to sentiment scores satisfying a positive-sentiment-score threshold for positive sentiments and (ii) one or more subsets of extracted sentences corresponding to sentiment scores satisfying a negative-sentiment-score threshold for negative sentiments. In some cases, the intelligent-text-insight system 106 further selects one or more subsets of extracted sentences corresponding to sentiment scores satisfying a medium-sentiment-score threshold.

Sentiment-score thresholds may be relative or fixed with respect to sentiment scores. For example, a positive-sentiment-score threshold may include a certain number or percentage of highest sentiment scores (e.g., extracted sentences corresponding to the highest 150 sentiment scores). A negative-sentiment-score threshold may include a certain number or percentage of lowest sentiment scores (e.g., extracted sentences corresponding to the lowest 150 sentiment scores). A medium-sentiment-score threshold may include a certain number or percentage of sentiment scores within the median of a distribution (e.g., extracted sentences corresponding to the 150 sentiment scores closest to a median). As a further example, a positive-sentiment-score threshold, a negative-sentiment-score threshold, and a medium-sentiment-score threshold may include sentiment scores above a threshold sentiment score (e.g., above +5), below a threshold sentiment score (e.g., above −5), and within a particular range of sentiment score (e.g., within −2 and +2), respectively.

To illustrate sorting the extracted sentences 340a-340n, in some implementations, the intelligent-text-insight system 106 groups the extracted sentences 340a-340n into (i) a positive segment comprising extracted sentences corresponding to sentiment scores indicating positive sentiments and (ii) a negative segment comprising extracted sentences corresponding to sentiment scores indicating negative sentiments. The intelligent-text-insight system 106 further selects, from the positive segment, a subset of extracted sentences satisfying a positive-sentiment-score threshold. Similarly, the intelligent-text-insight system 106 selects, from the negative segment, a subset of extracted sentences satisfying a negative-sentiment-score threshold. In such embodiments, the sorted set of extracted sentences 346 would include at least a subset of extracted sentences satisfying a positive-sentiment-score threshold and at least a subset of extracted sentences satisfying a negative-sentiment-score threshold.

As further shown in FIG. 3D, the intelligent-text-insight system 106 generates the clusters of extracted sentences 348a-348n respectively corresponding to linguistic contexts 350a-350n. To create the clusters of extracted sentences 348a-348n, the intelligent-text-insight system 106 optionally matches extracted sentences from the sorted set of extracted sentences 346 to the linguistic contexts 350a-350n. When performing such matching, the intelligent-text-insight system 106 determines that extracted sentences relate to (or are surrounded by) a word, phrase, or sentence (or synonyms thereof) capturing the linguistic contexts 350a-350n. Accordingly, the linguistic contexts 350a-350n may be word embeddings, phrase embeddings, or sentence embeddings from computational linguistics. In some cases, the clusters of extracted sentences 348a-348n further include extracted sentences that each correspond to a positive, a negative, a neutral, or a mixed sentiment indicator (e.g., a sentiment score).

To create the clusters of extracted sentences 348a-348n, in certain implementations, the intelligent-text-insight system 106 in particular applies a smooth-inverse-frequency algorithm. For instance, the intelligent-text-insight system 106 applies a smooth-inverse-frequency algorithm to each subset of extracted sentences from the sorted set of extracted sentences 346 to generate linguistic-context embeddings, where each of the linguistic contexts 350a-350n are linguistic-context embeddings. The intelligent-text-insight system 106 further determines an optimal number of clusters by, for example, applying the elbow method for K-means clustering, X-means clustering, Akaike information criterion, Bayesian information criterion, or another suitable method of determining a number of clusters. The intelligent-text-insight system 106 subsequently generates the clusters of extracted sentences 348a-348n by identifying extracted sentences corresponding to each of the linguistic-context embeddings. In some such cases, the intelligent-text-insight system 106 sets the number of vector dimensions to 128 for a smooth-inverse-frequency embedding. By applying a smooth-inverse-frequency algorithm, the intelligent-text-insight system 106 generates clusters of extracted sentences with a diverse set of linguistic vectors.

To apply the smooth-inverse-frequency algorithm, the intelligent-text-insight system 106 optionally lemmatizes word tokens assigned to each extracted sentence from the sorted set of extracted sentences 346, determines word probabilities among the extracted sentences, and determines weighted averages of those words. In some such cases, the intelligent-text-insight system 106 uses the smooth-inverse-frequency algorithm described by Sanjeev Arora et al., "A Simple but Tough-to-Beat Baseline for Sentence Embeddings," *International Conference on Learning Representations* (2017), the entire contents of which are hereby incorporated by reference.

Although the size of each cluster in FIG. 3D appears the same, the size of such clusters may vary. Indeed, a size of each of the clusters of extracted sentences 348a-348n may approximate the contribution or representation of each cluster to the response summary 356. Accordingly, a cluster of extracted sentences corresponding to highly positive sentiment scores or highly negative sentiment scores may result in a response summary of highly positive sentiment or highly negative sentiment.

As further shown in FIG. 3D, the intelligent-text-insight system 106 selects the extracted sentences 352a, 352b, and 352n from the clusters of extracted sentences 348a, 348b, and 348n, respectively. For instance, the intelligent-text-insight system 106 selects the extracted sentences 352a, 352b, and 352n from the clusters of extracted sentences 348a, 348b, and 348n, based on a relevance of the extracted sentences 352a, 352b, and 352n to the linguistic contexts 350a, 350b, and 350n, respectively. The intelligent-text-insight system 106 may select the extracted sentence 352a, for instance, as the most relevant or similar to the linguistic context 350a. As indicated in FIG. 3D, in certain implementations, the intelligent-text-insight system 106 selects multiple extracted sentences from each of the clusters of extracted sentences 348a-348n as a basis for (or for inclusion within) the response summary 356. Accordingly, the intelligent-text-insight system 106 optionally (and additionally) selects extracted sentences 352c, 352d, and 352e from the clusters of extracted sentences 348a, 348b, and 348n, respectively.

To illustrate the selection process, in some cases, the intelligent-text-insight system 106 selects the extracted sentences 352a, 352b, and 352n from the clusters of extracted sentences 348a, 348b, and 348n based on a maximum marginal relevance ("MMR") of the extracted sentences 352a, 352b, and 352n to the linguistic contexts 350a, 350b, 350n, respectively. For instance, the intelligent-text-insight system 106 applies an MMR algorithm to select the extracted sentence 352a from the cluster of extracted sentences 348a as the nearest neighbor to a linguistic-context embedding for the cluster of extracted sentences 348a, where the linguistic-context embedding constitutes the linguistic context 350a. In some such embodiments, the intelligent-text-insight system 106 applies an MMR algorithm to select multiple extracted sentences from each of the clusters of extracted sentences 348a-348n as the nearest neighbors to each linguistic-context embedding (e.g., by selecting the two or three nearest neighbors for each linguistic-context embedding).

As further shown in FIG. 3D, the intelligent-text-insight system 106 generates the response summary 356 based on the extracted sentences 352a, 352b, and 352n. Here, the response summary 356 represents a synopsis of the textual responses 336a-336n. To create a representative synopsis, in some embodiments, the intelligent-text-insight system 106 generates the response summary 356 comprising the extracted sentences 352*a*, 352*b*, and 352*n* or a portion of one or more of the extracted sentences 352*a*, 352*b*, or 352*n*. For instance, the intelligent-text-insight system 106 may concatenate, combine, or otherwise join together the extracted sentences 352*a*, 352*b*, and 352*n* or a portion thereof to form the response summary 356.

As further indicated by FIG. 3D, in some embodiments, the intelligent-text-insight system 106 uses a summarization neural network 354 to generate the response summary 356. As used in this disclosure, the term "summarization neural network" refers to an artificial neural network that compresses multiple extracted sentences selected from a cluster of extracted sentences to generate a compressed sentence representing a summary of the multiple extracted sentences. In some cases, a summarization neural network ranks the extracted sentences from each cluster of extracted sentences and compresses the ranked extracted sentences into a response summary.

In some embodiments, a summarization neural network takes the form an encoder-decoder architecture modeled by RNNs. For instance, in some cases, the summarization neural network takes the form of the sentence encoder, document encoder, and sentence extractor described by Shashi Narayan et al., "Ranking Sentences for Extractive Summarization with Reinforcement Learning," *Proceedings of North American Chapter of the Association for Computational Linguistics Human Language Technologies*, pp. 1747-1759 (2018), the entire contents of which are incorporated by reference.

To illustrate, in some embodiments, the intelligent-text-insight system 106 inputs the extracted sentences 352*a*, 352*b*, 352*c*, 352*d*, 352*e*, and 352*n* into the summarization neural network 354. In some cases, the extracted sentences 352*a*-352*n* are input into the summarization neural network 354 as concatenated extracted sentences in a digital document. The summarization neural network 354 subsequently compresses the extracted sentences 352*a* and 352*c* into a compressed sentence representing a summary of the extracted sentences 352*a* and 352*c*; compresses the extracted sentences 352*b* and 352*d* into a compressed sentence representing a summary of the extracted sentences 352*b* and 352*d*; and compresses the extracted sentences 352*e* and 352*n* into a compressed sentence representing a summary of the extracted sentences 352*e* and 352*n*. The summarization neural network 354 subsequently generates the response summary 356 comprising each of the compressed sentences.

In addition (or in the alternative to) generating a response summary as depicted in FIG. 3D, in some embodiments, the intelligent-text-insight system 106 accounts for one or both of (i) textual responses from verified purchasers and (ii) textual responses having a threshold amount of views (or votes) in favor or against such responses. In some embodiments, the intelligent-text-insight system 106 identifies a textual response from a verified purchaser or a textual response satisfying a threshold amount of views or votes in a field or value corresponding to the response. The intelligent-text-insight system 106 can subsequently use such fields or value for a filtered summary response.

For instance, in certain implementations, the intelligent-text-insight system 106 inputs textual responses from verified purchasers into the response-extraction-neural network 204 based on a user-selected filter for such verified purchasers. Upon applying a verified-purchaser filter, the intelligent-text-insight system 106 generates a response summary for textual responses from verified purchasers. Similarly, in some embodiments, the intelligent-text-insight system 106 filters textual responses by a threshold amount of views or votes based on a user-selected filter for views or votes and inputs such filtered textual responses into the response-extraction-neural network 204 (e.g., by applying a filter for the top ten, fifty, or one hundred textual responses receiving the most views or votes, where votes can be in favor or against the response as selected by the user). Upon applying a view filter or a vote filter, the intelligent-text-insight system 106 generates a response summary for textual responses satisfying a threshold amount of views or votes.

Figure 4B:

As noted above, in some embodiments, the intelligent-text-insight system 106 receives a query from a client device searching for a set of textual responses and subsequently provides a response summary for the set of textual responses to the client device for display within a graphical user interface. In some cases, the intelligent-text-insight system 106 further generates a summary comparison of different response summaries corresponding to different time periods to indicate changes over time in textual responses. FIGS. 4A-4B illustrate examples of such graphical user interfaces. As suggested above, the administrator application 110 optionally includes computer-executable instructions that cause the administrator device 108 to present the graphical user interfaces depicted in FIGS. 4A-4B.

As shown in FIG. 4A, for instance, the administrator device 108 presents a response summary 414*a* within a graphical user interface 404*a* corresponding to a screen 402. As indicated by various query-parameter options within the graphical user interface 404*a*, the intelligent-text-insight system 106 receives a query from the administrator device 108 requesting a response summary or searching for textual responses responding to a survey question. In response to receiving the query, the intelligent-text-insight system 106 provides the response summary 414*a* for the queried textual responses to the administrator device 108 for display within the graphical user interface 404*a*.

As further shown in FIG. 4A, the intelligent-text-insight system 106 provides various query-parameter options within the graphical user interface 404*a* for (i) the administrator 112 to select in constructing a query or (ii) the administrator device 108 to use as default parameters in a query. For example, the graphical user interface 404*a* includes a message-prompt indicator 406 indicating digital content to which textual responses respond and for which the intelligent-text-insight system 106 identifies textual responses in a query. While the message-prompt indicator 406 in FIG. 4A indicates a survey question as a parameter for the query, the message-prompt indicator 406 may indicate an email, a digital or online posting, a text message, or other digital message to which the intelligent-text-insight system 106 receives textual responses.

As a further example of query-parameter options, the graphical user interface 404*a* includes a time-period selector 408*a* for indicating a time period corresponding to textual responses of interest to the administrator 112. For instance, upon detecting a user selection within the time-period selector 408*a*, the administrator device 108 presents a selected time period within which the digital survey system 104 received (or recipient devices sent) textual responses—as a parameter for the query.

As further shown in FIG. 4A, the graphical user interface 404*a* also includes a selectable-topic option 410*a* that, upon user selection or by default, indicates a topic for textual responses as a parameter for the query. As indicated by FIG. 4A, the selectable-topic option 410*a* indicates "All Topics" by default. But the administrator device 108 may change a topic designated upon detecting a user selection by the administrator 112. In addition to this query-parameter option, the graphical user interface 404a includes a search field 416 within which the administrator 112 can enter terms (and the administrator device 108 detects terms) to search for digital messages, time periods, topics, or other parameters for a query.

As indicated by the query-parameter options in FIG. 4A, the intelligent-text-insight system 106 receives a query from the administrator device 108 requesting a response summary (and/or searching) for a set of textual responses defined by the user- or default-selections in the message-prompt indicator 406, the time-period selector 408a, and the selectable-topic option 410a. Based on receiving the query, the intelligent-text-insight system 106 identifies a set of textual responses and generates the response summary 414a for the set of textual responses. The response summary 414a includes a plain-language synopsis of textual responses to a digital message corresponding to the selected topic and time period in the graphical user interface 404a. The response summary 414a further includes a summary caption 412a indicating the selected topic and time period.

Turning back now to FIG. 4B, this figure illustrates the administrator device 108 presenting a different response summary corresponding to a different topic and a different time period. In particular, FIG. 4B depicts the administrator device 108 presenting a response summary 414b within a graphical user interface 404b corresponding to the screen 402. In this example, the intelligent-text-insight system 106 receives a query from the administrator device 108 requesting a response summary (and/or searching) for a set of textual responses defined by the user- or default-selections in the message-prompt indicator 406, a time-period selector 408b, and a selectable-topic option 410b. Based on receiving the query, the intelligent-text-insight system 106 identifies a set of textual responses and generates the response summary 414b for the set of textual responses.

As shown in FIG. 4B, the response summary 414b includes a summary caption 412b indicating a different selected topic and different selected time period than the response summary 414a shown in FIG. 4A. To identify recent changes in textual responses, the response summary 414b further includes a summary-modification indicator 418. The summary-modification indicator 418 identifies changes to a response summary in comparison to response summaries (or textual responses) for previous time periods. In this example, the summary-modification indicator 418 identifies a textual portion of the response summary 414b that is new or that has changed since a prior time period. While the time frame and subject may differ in other examples, the summary-modification indicator 418 identifies a change in textual responses in comparison to a previous quarter in which the intelligent-text-insight system 106 received textual responses to a particular survey question.

In some embodiments, the intelligent-text-insight system 106 further generates a summary comparison of different response summaries corresponding to different time periods to indicates changes over time in textual responses. For example, upon receiving an indication of a user selection of a time-comparison option 420 from the administrator device 108, the intelligent-text-insight system 106 generates and provides an additional response summary for textual responses corresponding to a different time period. In some such embodiments, for instance, the intelligent-text-insight system 106 provides the response summary 414b and an additional response summary (not shown) in a side-by-side comparison within a graphical user interface.

Figure 5A:
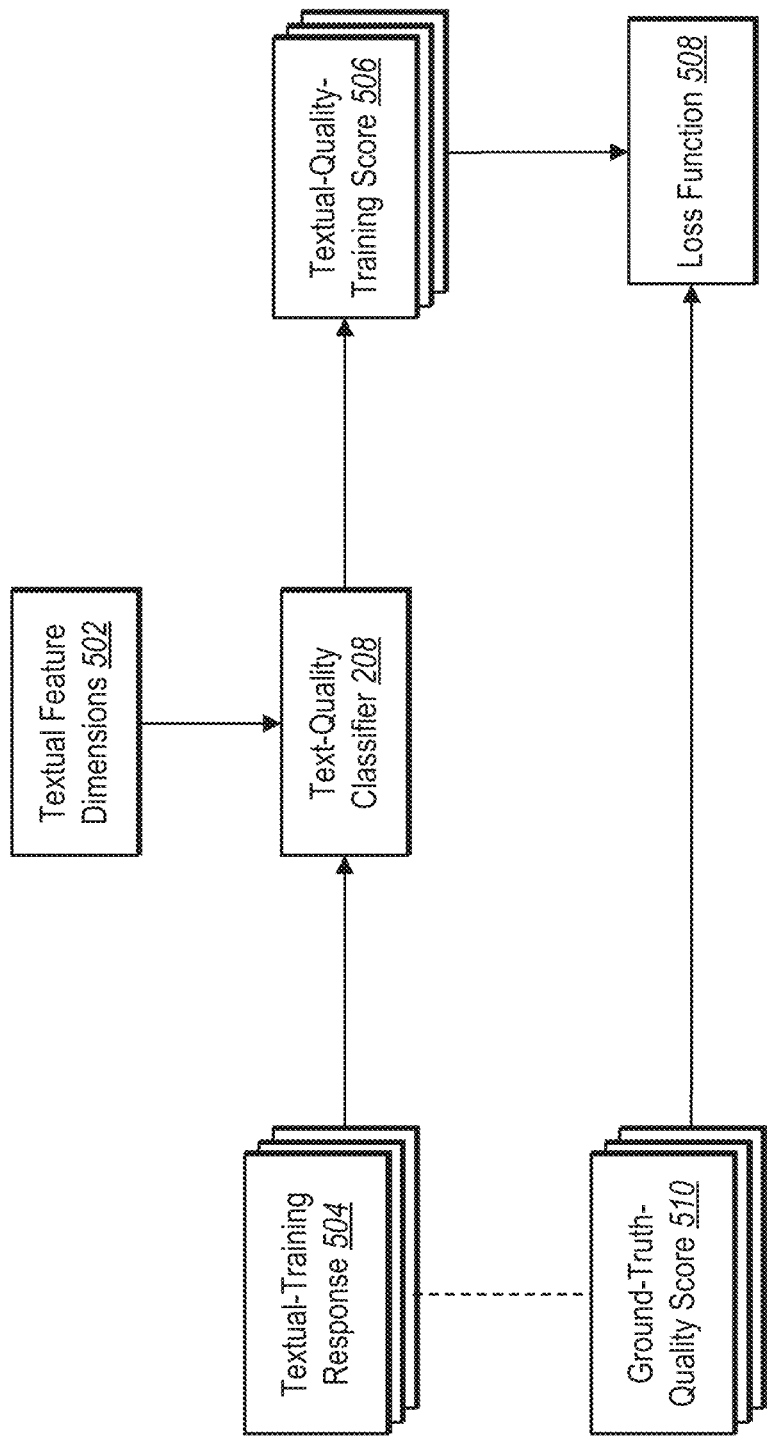
FIG. 5A illustrates an intelligent-text-insight system training a text-quality classifier to generate textual-quality-training scores for textual-training responses based on ground-truth-quality scores in accordance with one or more embodiments.

As suggested above, in some embodiments, the intelligent-text-insight system 106 trains a text-quality classifier. The intelligent-text-insight system 106 applies the text-quality classifier as part of selecting representative-textual responses for a set of textual responses. FIG. 5A illustrates the intelligent-text-insight system 106 training the text-quality classifier 208 to generate textual-quality-training scores for textual-training responses based on ground-truth-quality scores.

As shown in FIG. 5A, the intelligent-text-insight system 106 identifies textual feature dimensions for the text-quality classifier 208 to analyze upon receipt of textual responses. The intelligent-text-insight system 106 also iteratively provides textual-training responses to the text-quality classifier 208 to generate textual-quality-training scores for the textual-training responses. In each training iteration, the intelligent-text-insight system 106 determines a loss from a loss function 508 based on a comparison of a textual-quality-training score and a ground-truth-quality score. The intelligent-text-insight system 106 subsequently adjusts network parameters of the text-quality classifier 208 based on the determined loss. The intelligent-text-insight system 106 then inputs a further textual-training response into the text-quality classifier 208 as part of a subsequent training iteration.

As just suggested, the intelligent-text-insight system 106 identifies (or sets) textual feature dimensions 502 for the text-quality classifier 208 to analyze. The term "textual feature dimension" refers to a category of linguistic characteristics for a word, phrase, or sentence within a written text. In particular, in some embodiments, a textual feature dimension refers to a category of linguistic characteristics for a word, phrase, or sentence within (or metadata associated with) a textual response. Such textual feature dimensions can capture, but are not limited to, readability indices, response composition, speech composition, coherence, point-of-view identification, and suggestion identification of a textual response.

For example, textual feature dimensions include, but are not limited to, linguistic dimensions for average usefulness; part-of-speech tags; core part-of-speech tags; Simple Measure of Gobbledygook "SMOG" index; total length in characters; word count; suggestion identification; coherence; sentence count; Linsear Write Formula; average sentence length; determiners; numbers used in text; noun count; Gunning fog index; preposition count; conjunctions; Flesch Kincaid Grade; Dale Chall readability score; total adjective count or average number of adjectives in a sentence; average syllables in a word, phrase, or sentence; total adverb count or average number of adverbs in a sentence; total verb count or average number of verbs in a sentence; average word length in characters; foreign word count or average; Coleman-Liau index; automated readability index; use of third person; use of second person; use of first person; proper nouns used; pronouns used; Flesch-Reading-Ease score; and interjections.

In some embodiments, the intelligent-text-insight system 106 limits the number and type of textual feature dimension to decrease computer-processing load. For example, in some cases, the intelligent-text-insight system 106 identifies the following textual feature dimensions for the text-quality classifier 208: total length in characters, average sentence length, use of first person, word count, Coleman-Liau index, automated readability index, Gunning fog index, and Flesch-Reading-Ease score.

After identifying or setting the textual feature dimensions 502 for the text-quality classifier 208, the intelligent-textinsight system 106 trains the text-quality classifier 208. In an initial training iteration, the intelligent-text-insight system 106 inputs a textual-training response 504 into the text-quality classifier 208. As noted above, the text-quality classifier 208 a linear regression, multi-layered perceptron, random-forest classifier, or support vector machine ("SVM"). By contrast, the text-quality classifier 208 may include a CNN or RNN.

Upon receiving the textual-training response 504, the text-quality classifier 208 analyzes textual features of the textual-training response 504 corresponding to the textual feature dimensions 502 and generates a textual-quality-training score 506. As used in this disclosure, the term "textual-quality-training score" refers to a textual quality score generated while training a text-quality classifier. Accordingly, a textual-quality-training score refers to a score indicating a quality of writing in a textual-training response based on linguistic or textual features of the textual-training response. The text-quality classifier 208 classifies a textual-training response by classifying the response into a particular text-quality score (e.g., a score between 0.00 and 1.00).

As further indicated in FIG. 5A, the intelligent-text-insight system 106 determines a loss from the loss function 508 based on a comparison of the textual-quality-training score 506 and a ground-truth-quality score. As used in this disclosure, the term "ground-truth-quality score" refers to an empirically observed or human-generated score indicating a quality of writing in a textual-training response. In particular, in some embodiments, a ground-truth-quality score refers to an average score from multiple people scoring a quality of a textual-training response.

To implement the loss function 508, in some embodiments, the intelligent-text-insight system 106 compares the textual-quality-training score 506 and the ground-truth-quality score 510 in a mean-absolute-error function. In the alternative to a mean-absolute-error function, the intelligent-text-insight system 106 uses an L2-loss function, cross-entropy-loss function, a mean-squared-error-loss function, a root-mean-squared-error function, or other suitable loss function as the loss function 508. Upon determining a loss from the loss function 508, the intelligent-text-insight system 106 adjusts network parameters (e.g., weights or values) of the text-quality classifier 208 to decrease a loss for the loss function 508 in a subsequent training iteration. For example, the intelligent-text-insight system 106 may increase or decrease weights or values of the text-quality classifier 208 to minimize the loss in a subsequent training iteration.

As suggested by FIG. 5A, after adjusting network parameters of text-quality classifier 208 for an initial training iteration, the intelligent-text-insight system 106 performs additional training iterations until satisfying a convergence criteria. For instance, the intelligent-text-insight system 106 iteratively provides textual-training responses to the text-quality classifier 208 to generate textual-quality-training scores, iteratively determines losses from the loss function 508 based on comparisons of the textual-quality-training scores and ground-truth-quality scores, and iteratively adjusts network parameters of the text-quality classifier 208 based on the determined losses. In some cases, the intelligent-text-insight system 106 performs training iterations until the value or weights of the text-quality classifier 208 do not change significantly across training iterations.

Figure 5B:
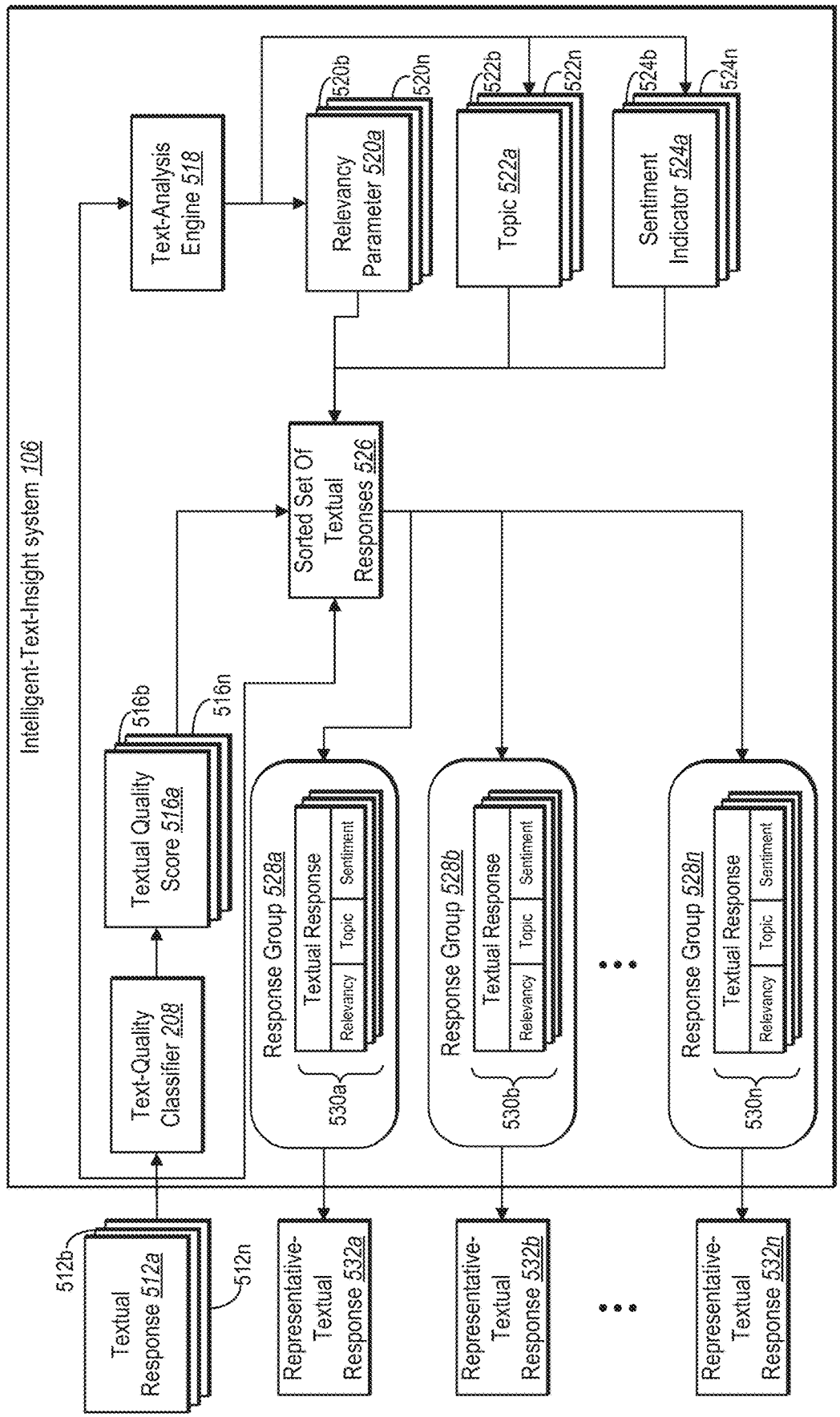
FIG. 5B an intelligent-text-insight system applying a textual-quality classifier and computational sentiment analysis to select representative-textual responses from a set of textual responses in accordance with one or more embodiments.

In addition (or in the alternative) to training the text-quality classifier 208, the intelligent-text-insight system 106 applies the text-quality classifier 208, computational sentiment analysis, and other text-based determinations to generate representative-textual responses for a set of textual responses. FIG. 5B illustrates one such embodiment of the intelligent-text-insight system 106.

As shown in FIG. 5B, the intelligent-text-insight system 106 provides textual responses 512a-512n to the text-quality classifier 208 to respectively generate textual quality scores 516a-516n. For the textual responses 512n-512n, the intelligent-text-insight system 106 further (and respectively) determines relevancy parameters 520a-520n, topics 522a-522n, and sentiment indicators 524a-524n. Based on the topics 522a-522n and the sentiment indicators 524a-524n, the intelligent-text-insight system 106 generates response groups of textual responses 528a-528n. Based on the relevancy parameters corresponding to the textual responses within the first and second response groups, the intelligent-text-insight system 106 selects representative-textual responses 532a-532n as representative of the textual responses 512a-512n.

As indicated in FIG. 5B, in some embodiments, the intelligent-text-insight system 106 responds to a query by selecting the textual responses 512a-512n as a set of textual responses. In some cases, the intelligent-text-insight system 106 can select the textual responses 512a-512n based on a query searching for textual responses corresponding to a topic or time period. For example, in certain implementations, the intelligent-text-insight system 106 selects the textual responses 512a-512n from a response database based on each textual response's relevance to a topic query and recency in receipt. As a further example, in some embodiments, the intelligent-text-insight system 106 selects the textual responses 512a-512n from the response database based on a time identifier for each textual response indicating that the intelligent-text-insight system 106 received (or a recipient device sent) the textual response within a queried time period.

As further shown in FIG. 5B, the intelligent-text-insight system 106 inputs the textual responses 512a-512n into the text-quality classifier 208. Critically, the intelligent-text-insight system 106 may input the textual responses 512a-512n into the text-quality classifier 208 either before or after receiving a query from a client device (e.g., a query by time period or topic). For instance, in some embodiments, the intelligent-text-insight system 106 inputs each of the textual responses 512a-512n into the text-quality classifier 208 upon receiving each textual response. Accordingly, the intelligent-text-insight system 106 may input more textual responses into the text-quality classifier 208 than those depicted in FIG. 5B. Upon input, and consistent with the disclosure above, the intelligent-text-insight system 106 uses the text-quality classifier 208 to respectively generate textual quality scores 516a-516n for the textual responses 512a-512n.

In addition to generating textual quality scores, the intelligent-text-insight system 106 inputs the textual responses 512a-512n into a text-analysis engine 518. As above, the intelligent-text-insight system 106 may input the textual responses 512a-512n into the text-analysis engine 518 to determine any relevancy parameter, topic, or sentiment indicator either before or after receiving a query from a client device or generating textual quality scores. As shown in FIG. 5B, the intelligent-text-insight system 106 uses the text-analysis engine to determine the relevancy parameters 520a-520n, the topics 522a-522n, and the sentiment indicators 524a-524n for the textual responses 512n-512n, respectively. The following paragraphs describe the intelligenttext-insight system 106 determining each of these outputs in turn with reference to pertinent descriptions above.

To determine the relevancy parameters 520a-520n, in some embodiments, the text-analysis engine 518 determines one or both of a topic-similarity score and a recency of a textual response. Upon receiving a query searching for textual responses corresponding to a topic, for instance, the text-analysis engine 518 determines topic-similarity scores for textual responses within a response database using a search-engine algorithm. In some such embodiments, the text-analysis engine 518 determines a Lucene-based search-engine score by, for example, using ElasticSearch, Lucene, Solr, or SenseiDB.

Additionally, or alternatively, in certain implementations, the text-analysis engine 518 determines a recency of a textual response by identifying a time identifier for each textual response within a response database. Such a time identifier indicates a time at which the intelligent-text-insight system 106 received (or a recipient device sent) the textual response. Upon receiving a query searching for textual responses corresponding to a time period, for instance, the text-analysis engine 518 identifies textual responses associated with time identifiers corresponding to the time period (e.g., within the queried time period). Accordingly, in some embodiments, the relevancy parameters 520a-520n can comprise either (i) a combination of topic-similarity scores and time identifiers in response to a queried topic or (ii) time identifiers in response to a queried time period.

To determine the topics 522a-522n, in some embodiments, the text-analysis engine 518 identifies a topic tag or topic identifier associated with each textual response from a response database. Such topic tags or identifiers may be associated with a particular sentence or with a textual response as a whole. For example, the text-analysis engine 518 may identify topic tags or topic identifiers for a particular employee, company, location, organization, model, product, service, survey question, keyword, or other topic. In some embodiments, the topic tag or topic identifier may match (or be identified as related to) a queried topic from a client device. Additionally, in some cases, the text-analysis engine 518 identifies an inverse-topic tag or an inverse-topic identifier associated with a textual response, where the tag or identifier identifies a topic with which a textual response is not associated.

To determine the sentiment indicators 524a-524n, in some embodiments, the text-analysis engine 518 determines one or both of a sentiment label and sentiment score for each textual response within a response database. In doing so, the text-analysis engine 518 may use any of the computational sentiment analyses described above. In some cases, such a sentiment label and a sentiment score indicate a positive sentiment, a negative sentiment, a mixed sentiment, or a neutral sentiment. Further, a sentiment label or a sentiment score may be specific to a response sentence within a textual response or applicable to an entire textual response.

As part of (or in addition to) determining the sentiment indicators 524a-524n, the intelligent-text-insight system 106 optionally determines a sentiment-polarity indicator for each textual response within a set of textual responses based on a corresponding sentiment score. For instance, the intelligent-text-insight system 106 may determine a sentiment-polarity indicator by identifying that a textual response corresponds to a sentiment score satisfying a positive-sentiment-score threshold (e.g., sentiment scores more than or equal to +8). Conversely, the intelligent-text-insight system 106 may further determine a sentiment-polarity indicator by identifying that a textual response corresponds to a sentiment score satisfying a negative-sentiment-score threshold (e.g., sentiment scores less than or equal to −8).

As further indicated by FIG. 5B, the intelligent-text-insight system 106 optionally sorts the textual responses 512a-512n to create a sorted set of textual responses 526. For instance, the intelligent-text-insight system 106 optionally sorts the textual responses 512a-512n based on one or both of the textual quality scores 516a-516n and the relevancy parameters 520a-520n. As an initial step in sorting, in some cases, the intelligent-text-insight system 106 filters out textual responses corresponding to relatively low textual quality scores. From among the textual responses 512a-512n, for instance, the intelligent-text-insight system 106 may select textual responses satisfying a textual-quality-score threshold (e.g., textual responses corresponding to a textual quality score more than or equal to particular score).

After filtering by textual quality score, the intelligent-text-insight system 106 can sort the textual responses satisfying the textual-quality-score threshold according to relevancy parameters for the selected textual responses. By filtering by textual quality score and relevancy parameters, in certain implementations, the intelligent-text-insight system 106 creates the sorted set of textual responses 526 from the textual responses 512a-512n.

As further shown in FIG. 5B, independent of whether the intelligent-text-insight system 106 sorts textual responses, the intelligent-text-insight system 106 generates the response groups of textual responses 528a-528n. To generate such response groups, in some embodiments, the intelligent-text-insight system 106 groups textual responses according to sentiment indicators and topics. For instance, the intelligent-text-insight system 106 can generate the response groups of textual responses 528a-528n based on the sentiment indicators and topics corresponding to the textual responses within the sorted set of textual responses 526.

In some embodiments, the response groups of textual responses 528a-528n correspond to different ranges of sentiment scores. For instance, the response group of textual responses 528a may correspond to a range of positive sentiment scores more than or equal to a positive-sentiment-score threshold. Similarly, the response group of textual responses 528b may correspond to a range of negative sentiment scores less than or equal to a negative-sentiment-score threshold. Further, the response group of textual responses 528b may correspond to a particular range of sentiment scores (e.g., a range of sentiment scores indicating a neutral sentiment).

In some such embodiments, the intelligent-text-insight system 106 groups textual responses from the sorted set of textual responses 526 based in part on sentiment-polarity indicators corresponding to textual responses. Accordingly, one or more of the response groups of textual responses 530a-530n may include textual responses corresponding to sentiment scores satisfying (or not satisfying) a positive-sentiment-score threshold or a negative-sentiment-score threshold.

As further shown in FIG. 5B, the response group of textual responses 528a includes textual responses 530a, where each textual response corresponds to a relevancy parameter, a topic, and a sentiment indicator (e.g., as identified by meta data). Similarly, the response group of textual responses 528b includes textual responses 530b, where each textual response corresponds to a relevancy parameter, a topic, and a sentiment indicator. Further, the response group of textual responses 528n includes textual responses 530n, where each textual response corresponds to a relevancy parameter, a topic, and a sentiment indicator. As described below, the intelligent-text-insight system 106 may use one or more of the relevancy parameters, topics, or sentiment indicators in each response group to select representative-textual responses.

After generating response groups, the intelligent-text-insight system 106 selects, for display on a client device, a representative-textual response from each of the response groups of textual responses 528a-528n. In particular, the intelligent-text-insight system 106 selects representative-textual responses 532a-532n from the response groups of textual responses 528a-528n, respectively. As shown in FIG. 5B, the representative-textual responses 532a-532n are each indicative or representative of the textual responses 512a-512n.

To select representative-textual responses, in some embodiments, the intelligent-text-insight system 106 selects representative-textual responses based on relevancy. In some such cases, for instance, the intelligent-text-insight system 106 selects a representative-textual response from each of the response groups of textual responses 528a-528n by identifying a textual response corresponding to a highest relevancy parameter. By selecting a textual response corresponding to a highest relevancy parameter, the intelligent-text-insight system 106 selects a textual response corresponding to one or both of a higher topic-similarity score and a more current recency from a response group of textual responses.

Additionally, or alternatively, in some embodiments, the intelligent-text-insight system 106 selects a representative-textual response from each of the response groups of textual responses 528a-528n based on textual quality score and relevancy. For instance, as noted above, the intelligent-text-insight system 106 optionally determines a relevancy parameter for each textual response by determining a topic-similarity score indicating a relevance of a textual response to a queried topic and a time identifier indicating a time associated with a textual response (e.g., a time stamp for time of receipt or sending). The intelligent-text-insight system 106 can accordingly select a representative-textual response from each response group by identifying a textual response based on topic-similarity scores and time identifiers among each response group.

Together with textual quality score, the intelligent-text-insight system 106 may select a textual response corresponding to factors in the following priority order: a highest topic-similarity score, a most recent time identifier, and a highest textual quality score among each response group. But the intelligent-text-insight system 106 can reorder the factors in any priority order to select a textual response from a response group.

Figure 6A:
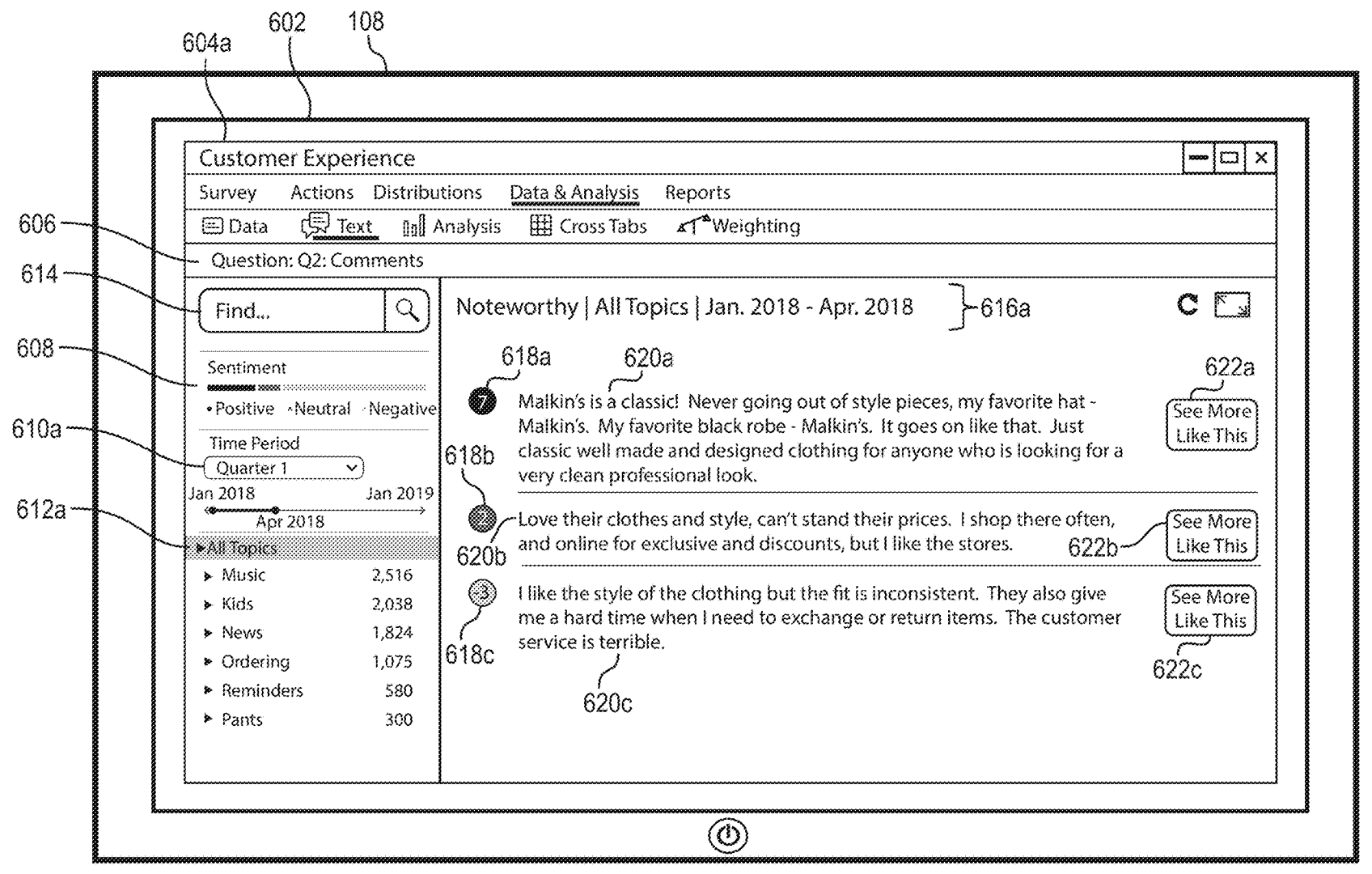
Figure 6B:
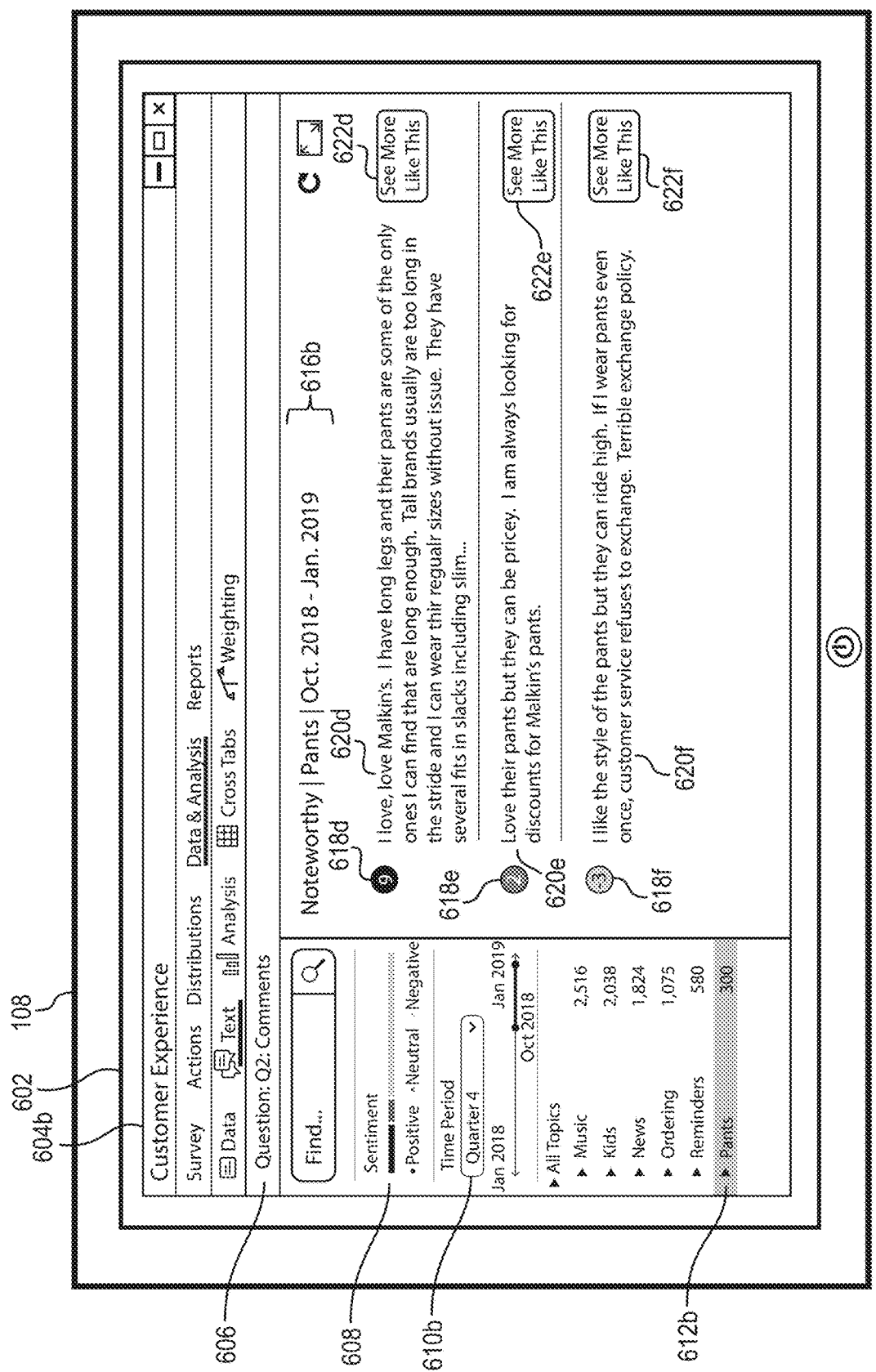

As noted above, in some embodiments, the intelligent-text-insight system 106 receives a query from a client device searching for a set of textual responses and subsequently provides representative-textual responses for the set of textual responses to the client device for display within a graphical user interface. FIGS. 6A-6B illustrate examples of such graphical user interfaces. As suggested above, the administrator application 110 optionally includes computer-executable instructions that cause the administrator device 108 to present the graphical user interfaces depicted in FIGS. 6A-6B.

As shown in FIG. 6A, for instance, the administrator device 108 presents representative-textual responses 620a-620c within a graphical user interface 604a corresponding to a screen 602. As indicated by various query-parameter options within the graphical user interface 604a, the intelligent-text-insight system 106 receives a query from the administrator device 108 requesting representative-textual responses or searching for textual responses responding to a survey question. In response to receiving the query, the intelligent-text-insight system 106 provides the representative-textual responses 620a-620c for the queried textual responses to the administrator device 108 for display within the graphical user interface 406a.

As further shown in FIG. 6A, the intelligent-text-insight system 106 provides various query-parameter options within the graphical user interface 604a for (i) the administrator 112 to select in constructing a query or (ii) the administrator device 108 to use as default parameters in a query. This disclosure names a few such query-parameter options. First, the graphical user interface 604a includes a message-prompt indicator 606 indicating digital content to which textual responses respond and for which the intelligent-text-insight system 106 identifies textual responses in a query. Second, the graphical user interface 604a includes a search field 614 within which the administrator 112 can enter terms (and the administrator device 108 detects terms) to search for parameters for a query. Third, the graphical user interface 604a includes a time-period selector 610a for indicating a time period corresponding to textual responses of interest to the administrator 112. Fourth, the graphical user interface 604a also includes a selectable-topic option 612a that, upon user selection or by default, indicates a topic for textual responses as a parameter for the query.

As indicated by the query-parameter options in FIG. 6A, the intelligent-text-insight system 106 receives a query from the administrator device 108 requesting representative-textual responses (and/or searching) for a set of textual responses defined by the user- or default-selections in the message-prompt indicator 606, the time-period selector 610a, and the selectable-topic option 612a. Based on receiving the query, the intelligent-text-insight system 106 identifies a set of textual responses and generates the representative-textual responses 620a-620c for the set of textual responses. As shown in FIG. 6A, the representative-textual responses 620a-620c include textual responses representative (or indicative) of responses to a digital message corresponding to the selected topic and time period.

As further shown in FIG. 6A, the intelligent-text-insight system 106 provides representative-response indicators that correspond to (and describe) the representative-textual responses 620a-620c within the graphical user interface 604a. For instance, the representative-textual responses 620a-620c correspond to a summary caption 616a indicating the selected topic and time period. The representative-textual responses 620a-620c also respectively correspond to sentiment scores 618a-618c shown in the graphical user interface 604a. Each of the sentiment scores 618a-618c in turn correspond to a sentiment label indicated on a sentiment-label key 608. As the sentiment scores 618a-618c and the sentiment-label key 608 indicate, in some embodiments, the intelligent-text-insight system 106 selects each of the representative-textual responses 620a-620c from a corresponding response group of textual responses. Such response groups may include textual responses corresponding to a range of sentiment scores or to a particular sentiment label (e.g., positive sentiment, neutral sentiment, negative sentiment).

In addition to the sentiment scores 618a-618c, the intelligent-text-insight system 106 provides similar-response options 622a-622c respectively corresponding to the representative-textual responses 620a-620c within the graphical user interface 604a. Upon selection of a similar-response option, the intelligent-text-insight system 106 provides additional textual responses similar to a corresponding representative-textual response. In some embodiments, for instance, the intelligent-text-insight system 106 receives an indication of a user selection of one of the similar-response options 622a-622c from the administrator device 108. In response to receiving an indication of such a user selection, the intelligent-text-insight system 106 provides, for display on the administrator device 108, one or more textual responses similar to a corresponding representative-textual response from the representative-textual responses 620a-620c.

For example, in response to receiving an indication of a user selection of the similar-response option 622a, the intelligent-text-insight system 106 provides, for display on the administrator device 108, one or more textual responses similar to the representative-textual response 620a. To select and display one or more similar textual responses, in some embodiments, the intelligent-text-insight system 106 selects additional representative-textual responses from a response group of textual responses from which the representative-textual response 620a was selected. Consistent with the disclosure above, the intelligent-text-insight system 106 can select additional representative-textual responses from a response group of textual responses based on one or more of textual quality scores or relevancy parameters, including topic-similarity scores and time identifiers.

Turning back now to FIG. 6B, this figure illustrates the administrator device 108 presenting different representative-textual responses corresponding to a different topic and a different time period. In particular, FIG. 6B depicts the administrator device 108 presenting representative-textual responses 620d-620f within a graphical user interface 604b corresponding to the screen 602. In this example, the intelligent-text-insight system 106 receives a query from the administrator device 108 requesting representative-textual responses (and/or searching) for a set of textual responses defined by the user- or default-selections in the message-prompt indicator 606, a time-period selector 610b, and a selectable-topic option 612b. Based on receiving the query, the intelligent-text-insight system 106 identifies a set of textual responses and generates the representative-textual responses 620d-620f for the set of textual responses.

As further shown in FIG. 6B, the intelligent-text-insight system 106 provides representative-response indicators that correspond to (and describe) the representative-textual responses 620d-620f within the graphical user interface 604b. For instance, the representative-textual responses 620d-620f correspond to a summary caption 616b indicating a different selected topic and a different time period and to sentiment scores 618d-618f. In addition to the sentiment scores 618d-618f, the intelligent-text-insight system 106 provides similar-response options 622d-622f respectively corresponding to the representative-textual responses 620d-620f within the graphical user interface 604b. The similar-response options 622d-622f function similarly to the similar-response options 622a-622c above, but with respect to the representative-textual responses 620d-620f.

As suggested above, in some embodiments, the intelligent-text-insight system 106 generates a response summary and representative-textual responses for a same set of textual responses. For instance, in response to a query searching for a set of textual responses corresponding to a same topic and time period, the intelligent-text-insight system 106 optionally generates the response summary 414a and the representative-textual responses 620a-620c for display within a graphical user interface. Similarly, in response to a query searching for a different set of textual responses corresponding to a different topic and a different time period, the intelligent-text-insight system 106 optionally generates the response summary 414b and the representative-textual responses 620d-620f for display within a graphical user interface.

Figure 7A:
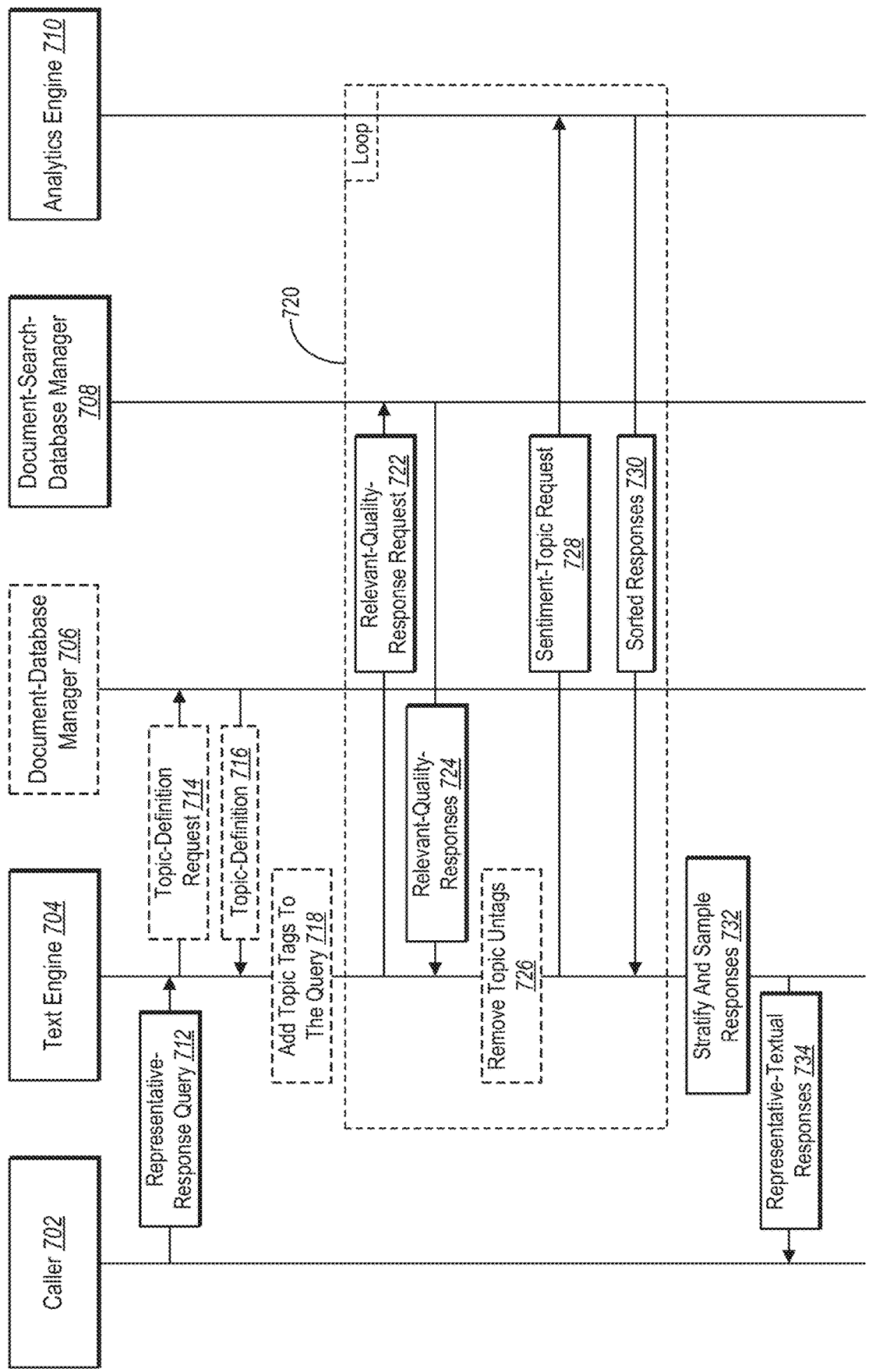
FIGS. 7A-7B illustrate sequence-flow diagrams of an intelligent-text-insight system using different architectures to select representative-textual responses from a set of textual responses in response to a query in accordance with one or more embodiments.
Figure 7B:
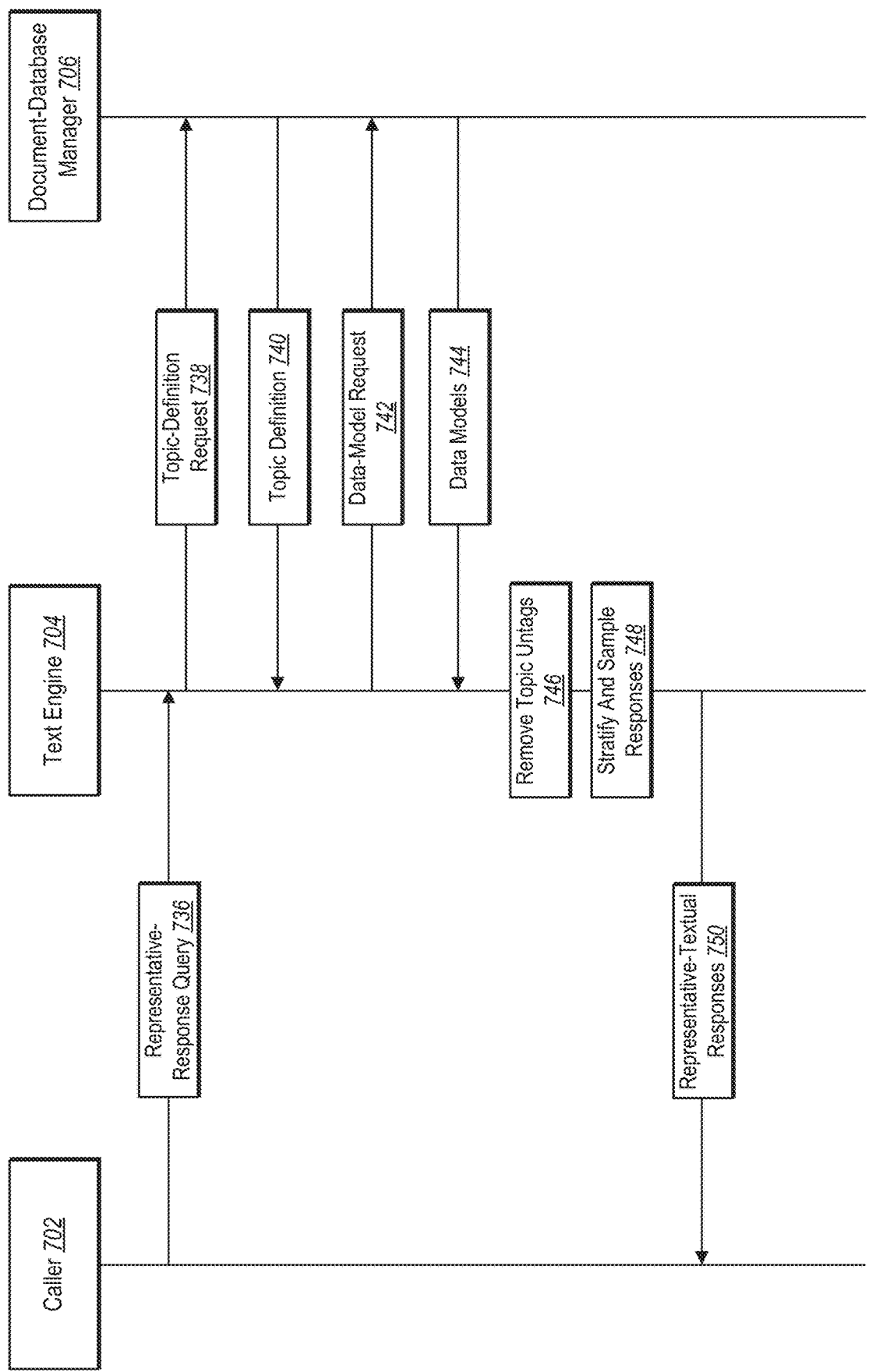

Turning now to FIGS. 7A-7B, these figures illustrate sequence-flow diagrams of the intelligent-text-insight system 106 using a distributed network architecture of hardware and software to select representative-textual responses from a set of textual responses in response to a query by topic. As shown in FIGS. 7A-7B, a caller 702 represents hardware and/or software components that send queries for representative-textual responses. A text engine 704 represents hardware and/or software components that receive and process queries for representative-textual responses. The document-database manager 706 and the document-search-database manager 708 respectively represent a document-oriented-database program, such as MongoDB, and a database-management system, such as CrateDB. The analytics engine 710 represents a data-analytics engine that retrieves and filters textual responses.

As shown in FIG. 7A, for example, the caller 702 sends a representative-response query 712 to the text engine 704 requesting representative-textual responses for a set of textual responses corresponding to a topic. The text engine 704 optionally sends a topic-definition request 714 to the document-database manager 706 requesting query parameters that define the topic consistent with the representative-response query 712. The document-database manager 706 in turn sends a topic-definition 716 defining query parameters for the topic. Additionally, the text engine 704 optionally adds topic tags to the query 718 by adding topic tags corresponding (or relevant) to the query parameters for the topic.

As further shown in FIG. 7A, the text engine 704 sends a relevant-quality-response request 722 to the document-search-database manager 708 searching for textual responses that match (or a responsive to) the queried topic, satisfy a topic-similarity-score threshold, and satisfy a textual-quality-score threshold. In response to the relevant-quality-response request 722, the document-search-database manager 708 sends relevant-quality-responses 724 to the text engine 704. For example, the document-search-database manager 708 sends textual responses that match (or a responsive to) the queried topic, satisfy the topic-similarity-score threshold, and satisfy the textual-quality-score threshold. In some embodiments, the text engine 704 removes topic untags 726 by removing topic a specific type of tag (e.g., inverse topic tags) that identify topics with which a textual response is not associated.

As further indicated by FIG. 7A, the text engine 704 sends a sentiment-topic request 728 to the analytics engine 710 requesting that the analytics engine 710 identify textual responses from the relevant-quality-responses 724 according to particular sentiment indicators and topic. The sentiment-topic request 728 optionally includes a request to filter textual responses by sentiment indicators (e.g., sentiment scores and sentiment-polarity indicators). In response to the sentiment-topic request 728, the analytics engine 710 sends sorted responses 730 to the text engine 704 comprising textual responses that match the particular sentiment indicators and topic and (optionally) have been filtered according to sentiment indicators. As further indicated by a loop 720, the intelligent-text-insight system 106 optionally performs the actions within the loop 720 until the text engine 704 receives a sufficient number of textual response satisfying the representative-response query 712.

In addition to retrieving the sorted responses 730, in some embodiments, the text engine 704 further stratifies and samples responses 732 by ranking and selecting textual responses from response groups of textual responses for display on a client device. Upon selecting representative-textual responses, the text engine 704 sends the representative-textual responses 734 to the caller 702 in response to the representative-response query 712. The representative-textual responses 734 are representative or indicative of a set of textual responses indicated by the representative-response query 712.

As noted above, FIG. 7A depicts an example network architecture in a query by topic. By contrast, in a query by time period without a topic, the intelligent-text-insight system performs the same actions shown in FIG. 7A, but without the topic-definition request 714 or the topic-definition 716 from the document-database manager 706.

FIG. 7B depicts an alternative network architecture used by the intelligent-text-insight system 106 to select representative-textual responses from a set of textual responses in response to a query by topic. As indicated by FIG. 7B, the intelligent-text-insight system 106 uses data models comprising a number of textual responses that the intelligent-text-insight system 106 identifies as responsive to digital content (e.g., a particular survey question) before queries. In some embodiments, the intelligent-text-insight system 106 identifies textual responses representative of other textual responses—that is, representative-textual responses— and includes those within the response groups. As part of using such data models, the intelligent-text-insight system 106 groups the identified textual responses into response groups consistent with the disclosure above.

In some such embodiments, the intelligent-text-insight system 106 frequently or periodically updates data models (or updates such models after each query) by performing actions 714-732 in FIG. 7A—but in response to an update-model request from the caller 702. By creating such pre-formed response groups of textual responses before receiving a query and updating data models, the intelligent-text-insight system 106 expedites retrieval of representative-textual responses for a query.

As shown in FIG. 7B, for example, the caller 702 sends a representative-response query 736 to the text engine 704 requesting representative-textual responses for a set of textual responses corresponding to a topic. The text engine 704 subsequently sends a topic-definition request 738 to the document-database manager 706 requesting query parameters that define the topic consistent with the representative-response query 736. The document-database manager 706 in turn sends a topic-definition 740 defining query parameters for the topic.

As further shown in FIG. 7B, the text engine 704 sends a data-model request 742 to the document-database manager 706 requesting textual response from preformed response groups of textual responses corresponding to the query parameters defining the topic. In response to the data-model request 742, the document-database manager 706 sends data models 744 comprising textual responses from the preformed response groups. In some embodiments, the text engine 704 further removes topic untags 746 by removing topic specific tags (e.g., inverse topic tags) that identify topics with which textual responses are not associated.

In addition to retrieving the data models 744, the text engine 704 further stratifies and samples responses 748 by ranking and selecting textual responses from the data models 744 for display on a client device. Upon selecting representative-textual responses, the text engine 704 sends the representative-textual responses 750 to the caller 702 in response to the representative-response query 736. The representative-textual responses 750 are representative or indicative of a set of textual responses indicated by the representative-response query 736.

Figure 8:
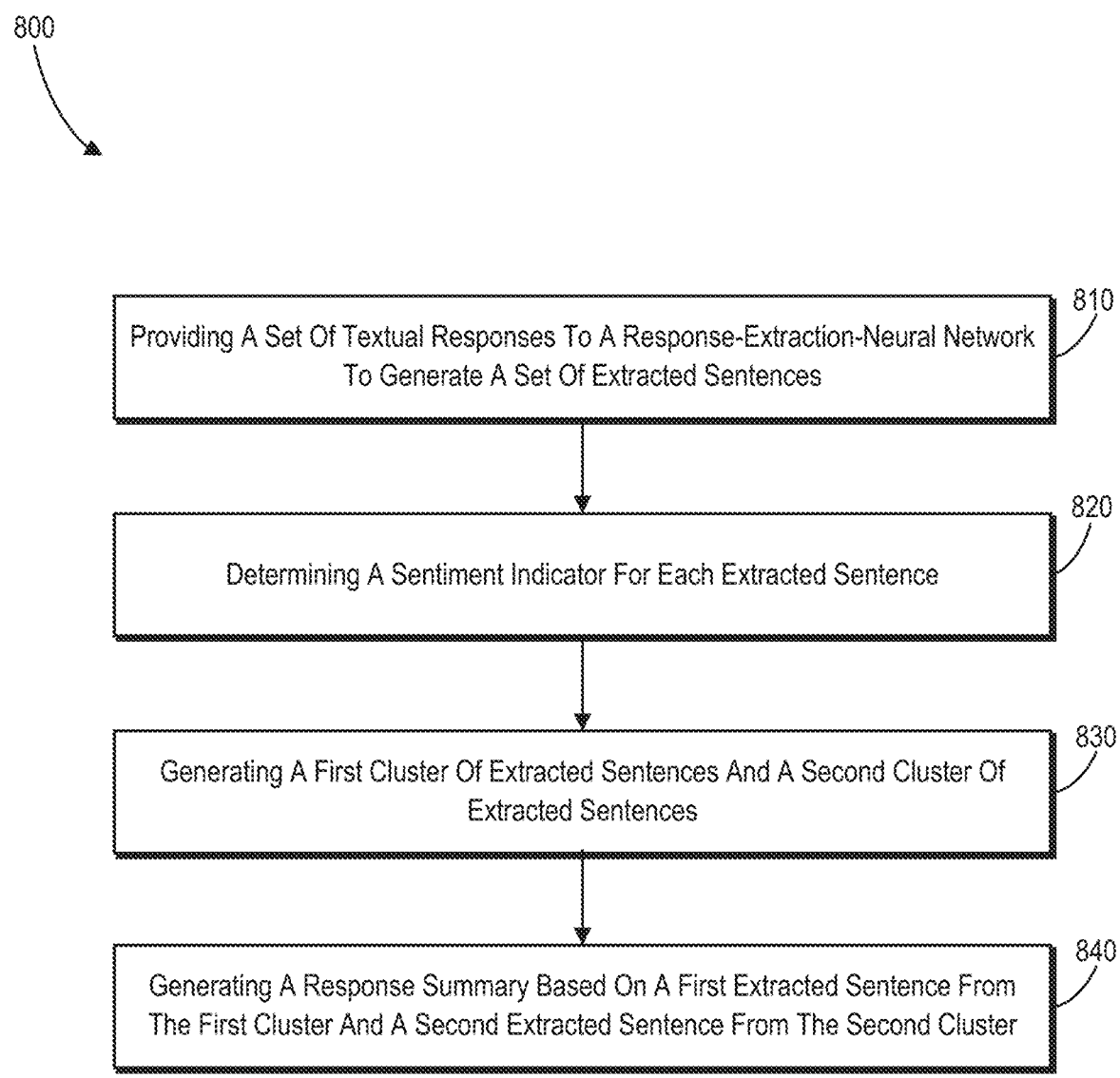
FIG. 8 illustrates a flowchart of a series of acts for applying a response-extraction-neural network and computational sentiment analysis to generate a response summary for a set of textual responses in accordance with one or more embodiments.

Turning now to FIG. 8, this figure illustrates a flowchart of a series of acts 800 of applying a response-extraction-neural network and computational sentiment analysis to generate a response summary for a set of textual responses in accordance with one or more embodiments. While FIG. 8 illustrates acts according to one embodiment, alternative embodiments may omit, add to, reorder, and/or modify any of the acts shown in FIG. 8. The acts of FIG. 7 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of providing a set of textual responses to a response-extraction-neural network to generate a set of extracted sentences. In particular, in some embodiments, the act 810 includes providing a set of textual responses to a response-extraction-neural network to generate a set of extracted sentences, wherein each extracted sentence corresponds to a selected sentence from the set of textual responses.

For instance, in certain implementations, generating the set of extracted sentences comprises: extracting selected sentences from the set of textual responses utilizing an extractor-selection network of the response-extraction-neural network; and paraphrasing one or more sentences from the selected sentences utilizing an abstractor network of the response-extraction-neural network.

As further shown in FIG. 8, the acts 800 include an act 820 of determining a sentiment indicator for each extracted sentence. In particular, in some embodiments, the act 820 includes determining a sentiment indicator for each extracted sentence from the set of extracted sentences to sort the set of extracted sentences. For instance, in some cases, determining the sentiment indicator for each extracted sentence comprises determining, for each extracted sentence, one or both of a sentiment score and a sentiment label indicating a positive sentiment or a negative sentiment.

As further shown in FIG. 8, the acts 800 include an act 830 of generating a first cluster of extracted sentences and a second cluster of extracted sentences. In particular, in some embodiments, the act 830 includes, based on a sorted set of extracted sentences, generating a first cluster of extracted sentences corresponding to a first context and a second cluster of extracted sentences corresponding to a second context.

As further shown in FIG. 8, the acts 800 include an act 840 of generating a response summary based on a first extracted sentence from the first cluster and a second extracted sentence from the second cluster. In particular, in certain implementations, the act 830 includes generating a response summary for the set of textual responses based on a first extracted sentence from the first cluster of extracted sentences and a second extracted sentence from the second cluster of extracted sentences.

For instance, in certain implementations, generating the response summary for the set of textual responses based on the first extracted sentence and the second extracted sentence comprises generating the response summary for the set of textual responses comprising both the first extracted sentence and the second extracted sentence. In some such embodiments, generating the response summary for the set of textual responses based on the first extracted sentence and the second extracted sentence comprises generating the response summary for the set of textual responses comprising a portion of the first extracted sentence and a portion of the second extracted sentence.

In one or more embodiments, selecting the first extracted sentence and the second extracted sentence for the response summary comprises: selecting the first extracted sentence from the first cluster of extracted sentences based on a relevance of the first extracted sentence to a first linguistic context embedding; and selecting the second extracted sentence from the second cluster of extracted sentences based on a relevance of the second extracted sentence to a second linguistic context embedding. In particular, in some cases, selecting the first extracted sentence and the second extracted sentence for the response summary comprises: selecting the first extracted sentence from the first cluster of extracted sentences based on a maximum marginal relevance of the first extracted sentence to the first linguistic context embedding; and selecting the second extracted sentence from the second cluster of extracted sentences based on a maximum marginal relevance of the second extracted sentence to the second linguistic context embedding.

By contrast, in certain implementations, selecting the first extracted sentence and the second extracted sentence for the response summary comprises: selecting the first extracted sentence and a third extracted sentence from the first cluster of extracted sentences based on a relevance of each of the first extracted sentence and the third extracted sentence to a first linguistic context embedding; selecting the second extracted sentence and a fourth extracted sentence from the second cluster of extracted sentences based on a relevance of each of the second extracted sentence and the fourth extracted sentence to a second linguistic context embedding; providing the first, second, third, and fourth extracted sentences to a summarization neural network to generate: a first compressed sentence representing a summary of the first extracted sentence and the third extracted sentence: and a second compressed sentence representing a summary of the second extracted sentence and the fourth extracted sentence; and generating the response summary for the set of textual responses comprising the first compressed sentence and the second compressed sentence.

In addition to the acts 810-840, the acts 800 may include additions or variations. In certain implementations, for instance, the acts 800 include providing the set of textual responses to the response-extraction-neural network by: receiving, from a client device, a user query searching for textual responses corresponding to a time period and responding to a survey question; and selecting the set of textual responses based on a time identifier for each textual response corresponding to the time period indicated by the user query; and determining the sentiment indicator for each extracted sentence from the set of extracted sentences by determining, for each extracted sentence, a sentiment score indicating a positive sentiment or a negative sentiment. In some cases, the acts 800 further include providing the response summary for the set of textual responses to the client device for display within a graphical user interface.

By contrast, in one or more embodiments, the acts 800 include providing the set of textual responses to the response-extraction-neural network by: receiving, from a client device, a user query searching for textual responses corresponding to a topic and responding to a survey question; and selecting the set of textual responses based on a relevance of each textual response from the set of textual responses to the user query; and determining the sentiment indicator for each extracted sentence from the set of extracted sentences by determining, for each extracted sentence, a sentiment score indicating a positive sentiment corresponding to the topic or a negative sentiment corresponding to the topic. In some cases, the acts 800 further include providing the response summary for the set of textual responses to the client device for display within a graphical user interface.

Further, in certain implementations, the acts 800 include determining the sentiment indicator for each extracted sentence by determining a sentiment score indicating a positive sentiment or a negative sentiment for each extracted sentence; and generating the first cluster of extracted sentences corresponding to the first context and the second cluster of extracted sentences corresponding to the second context by: generating the first cluster of extracted sentences corresponding to positive sentiment scores and to a first linguistic context embedding; and generating the second cluster of extracted sentences corresponding to negative sentiment scores and to a second linguistic context embedding.

In addition to the acts 810-840, in some embodiments, the acts 800 further include generating the response summary for the set of textual responses in response to a query for textual responses corresponding to a time period and responding to a survey question; generating an additional response summary for an additional set of textual responses in response to an additional query for additional textual responses corresponding to an additional time period and responding to the survey question; and providing, for display on a client device, a summary comparison of the response summary for the set of textual responses and the additional response summary for the additional set of textual responses.

Additionally, in certain implementations, the acts 800 further include generating the sorted set of extracted sentences comprises: selecting, from the set of textual responses, a first subset of extracted sentences corresponding to sentiment scores satisfying a positive-sentiment-score threshold for positive sentiments; and selecting, from the set of textual responses, a second subset of extracted sentences corresponding to sentiment scores satisfying a negative-sentiment-score threshold for negative sentiments.

In particular, in some cases, generating the sorted set of extracted sentences comprises: grouping the set of extracted sentences into a positive segment comprising extracted sentences corresponding to sentiment scores indicating positive sentiments and a negative segment comprising extracted sentences corresponding to sentiment scores indicating negative sentiments; selecting, from the positive segment, a first subset of extracted sentences satisfying a positive-sentiment-score threshold; and selecting, from the negative segment, a second subset of extracted sentences satisfying a negative-sentiment-score threshold.

Further, in one or more embodiments, the acts 800 include matching each extracted sentence from the first subset of extracted sentences to a first linguistic-context embedding and each extracted sentence from the second subset of extracted sentences to a second linguistic-context embedding.

In particular, in certain implementations, generating the first cluster of extracted sentences corresponding to the first context and the second cluster of extracted sentences corresponding to the second context comprises: applying a smooth-inverse-frequency algorithm to the first subset of extracted sentences to generate a first linguistic context embedding and a third linguistic context embedding; generating the first cluster of extracted sentences by identifying, from among the first subset of extracted sentences, extracted sentences corresponding to the first linguistic context embedding; applying the smooth-inverse-frequency algorithm to the second subset of extracted sentences to generate a second linguistic context embedding; and generating the second cluster of extracted sentences by identifying, from among the second subset of extracted sentences, extracted sentences corresponding to the second linguistic context embedding.

As noted above, in some embodiments, the intelligent-text-insight system 106 trains a response-extraction-neural network. Accordingly, in some cases, the acts 800 include training an extractor-selection network of the response-extraction-neural network by: providing a textual-training response to the extractor-selection network of the response-extraction-neural network to extract a selected-training sentence from the textual-training response; determining a first loss from a first loss function based on a comparison of the selected-training sentence and a similar-response sentence corresponding to a ground-truth-paraphrased sentence; and adjusting network parameters of the extractor-selection network based on the determined first loss.

Relatedly, in some cases, the acts 800 include training an abstractor network of the response-extraction-neural network by: providing the selected-training sentence from the textual-training response to the abstractor network of the response-extraction-neural network to generate a paraphrased-training sentence; determining a second loss from a second loss function based on a comparison of the paraphrased-training sentence and the ground-truth-paraphrased sentence; and adjusting network parameters of the abstractor network based on the determined second loss.

Figure 9:
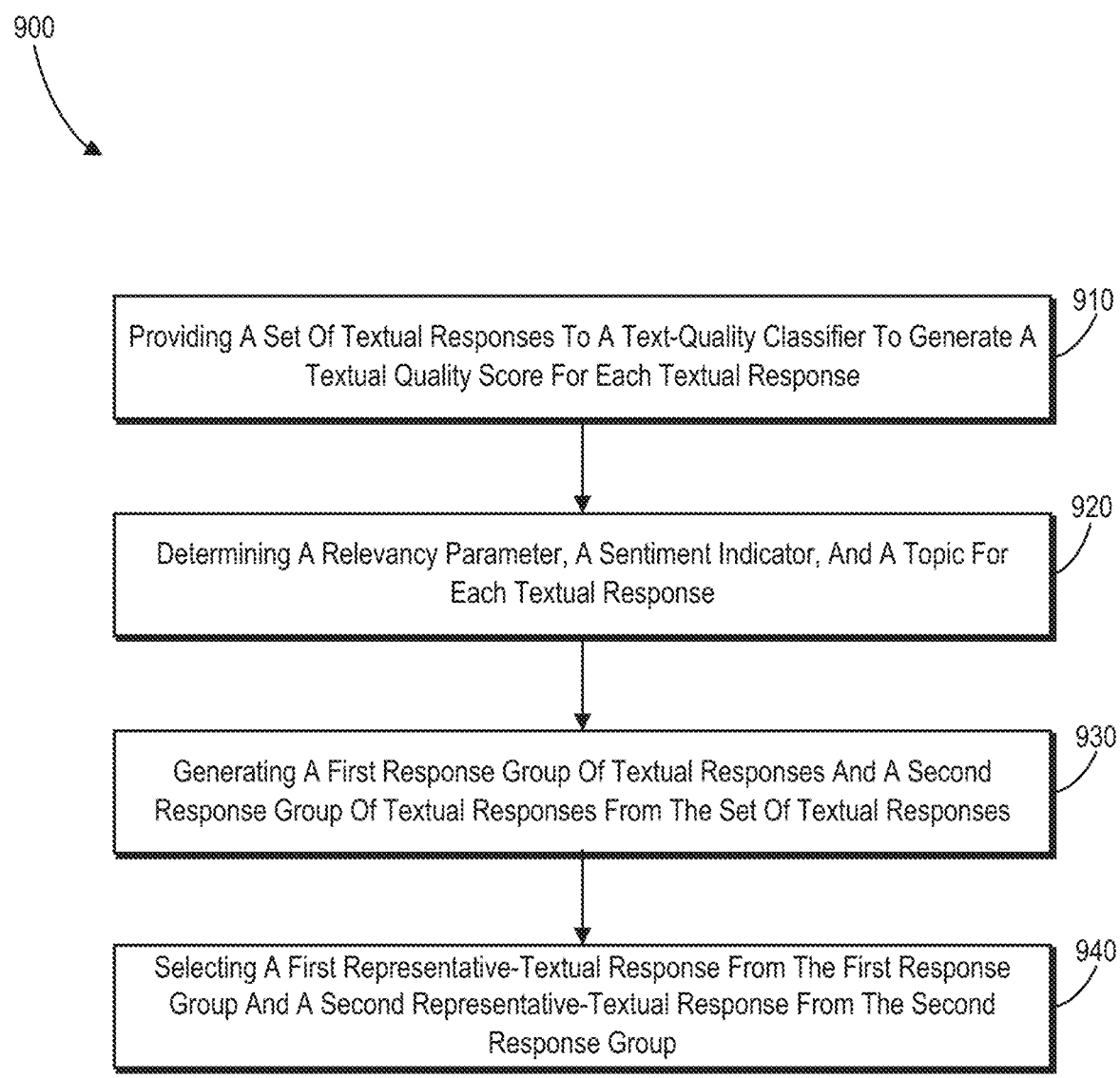
FIG. 9 illustrates a flowchart of a series of acts for applying a textual-quality classifier and computational sentiment analysis to select representative-textual responses from a set of textual responses in accordance with one or more embodiments.

Turning now to FIG. 9, this figure illustrates a flowchart of a series of acts 900 of applying a textual-quality classifier and computational sentiment analysis to select representative-textual responses from a set of textual responses in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the acts 900 include an act 910 of providing a set of textual responses to a text-quality classifier to generate a textual quality score for each textual response. In particular, in some embodiments, the act 910 includes providing a set of textual responses to a text-quality classifier to generate a textual quality score for each textual response from the set of textual responses.

For example, in some cases, providing the set of textual responses to the text-quality classifier to generate the textual quality score for each textual response comprises: inputting the set of textual responses into a random-forest classifier; and utilizing the random-forest classifier to generate the textual quality score for each textual response based on textual feature corresponding to each textual response.

As further shown in FIG. 9, the acts 900 include an act 920 of determining a relevancy parameter, a sentiment indicator, and a topic for each textual response. In particular, in some embodiments, the act 820 includes determining a relevancy parameter, a sentiment indicator, and a topic for each textual response from the set of textual responses, wherein a given relevancy parameter indicates a relevance of a given textual response to a user query, a given sentiment indicator indicates a linguistic sentiment of the given textual response, and a given topic indicates a subject matter of the given textual response.

As further shown in FIG. 9, the acts 900 include an act 930 of generating a first response group of textual responses and a second response group of textual responses from the set of textual responses. In particular, in some embodiments, the act 930 includes generating a first response group of textual responses and a second response group of textual responses from the set of textual responses based on the sentiment indicator and the topic for each textual response from the set of textual responses.

As further shown in FIG. 9, the acts 900 include an act 940 of selecting a first representative-textual response from the first response group and a second representative-textual response from the second response group. In particular, in some embodiments, the act 940 includes selecting, for display on a client device, a first representative-textual response from the first response group and a second representative-textual response from the second response group based on the relevancy parameter for each textual response within the first response group and the relevancy parameter for each textual response within the second response group.

In addition to the acts 910-940, the acts 900 may include additions or variations. For instance, in some embodiments, the acts 900 include selecting the set of textual responses by: receiving, from a client device, a user query searching for textual responses corresponding to a time period and responding to a survey question; and selecting the set of textual responses based on a time identifier for each textual response corresponding to the time period indicated by the user query.

By contrast, in certain implementations, the acts 900 include selecting the set of textual responses by: receiving, from a client device, a user query searching for textual responses corresponding to a topic and responding to a survey question; and selecting the set of textual responses based on a relevance of each textual response from the set of textual responses to the user query.

As further suggested above, in certain implementations, the acts 900 include sorting the set of textual responses by: selecting, from a response database, textual responses satisfying a textual-quality-score threshold; and sorting the selected textual responses based on the relevancy parameter for each textual response from the selected textual responses to create a sorted set of textual responses.

Further, in some cases, the acts 900 further include generating, from the sorted set of textual responses, the first response group of textual responses corresponding to a first range of sentiment indicators and the second response group of textual responses corresponding to a second range of sentiment indicators based on the sentiment indicator and the topic for each textual response from the sorted set of textual responses.

As suggested above, in some embodiments, the acts 900 include determining the sentiment indicator for each textual response by determining, for each textual response, a sentiment score indicating a positive sentiment or a negative sentiment; determining, for each textual response, a sentiment-polarity indicator based on the sentiment score for each textual response satisfying or not satisfying a positive-sentiment-score threshold or a negative-sentiment-score threshold; and generating the first response group of textual responses and the second response group of textual responses based on the sentiment score, the sentiment-polarity indicator, and the topic for each textual response from the set of textual responses.

Further, in certain implementations, the acts 900 include determining the relevancy parameter for each textual response from the set of textual responses by determining, for each textual response, a topic-similarity score indicating a relevance of the textual response to a queried topic and a time identifier indicating a time associated with the textual response; selecting, for display on the client device, the first representative-textual response from the first response group based on the textual quality score, the topic-similarity score, and the time identifier for each textual response within the first response group; and selecting, for display on the client device, the second representative-textual response from the second response group based on the textual quality score, the topic-similarity score, and the time identifier for each textual response within the second response group.

As suggested above, in some embodiments, the intelligent-text-insight system 106 provides similar-response options. For example, in some cases, the acts 900 include providing, for display on the client device, a similar-response option corresponding to the first representative-textual response to view additional textual responses from the set of textual responses similar to the first representative-textual response; receiving, from the client device, an indication of a user selection of the similar-response option; and in response to receiving the indication of the user selection, provide, for display on the client device, a third textual response from the first response group based on the relevancy parameter for each textual response within the first response group.

In addition (or in the alternative) to applying the text-quality classifier, in some embodiments, the intelligent-text-insight system 106 trains a text-quality classifier. For instance, in certain implementations, the acts 900 include training the text-quality classifier by: identifying textual feature dimensions for the text-quality classifier to analyze upon receipt of textual responses; providing a textual-training response to the text-quality classifier to generate a textual-quality-training score for the textual-training response; determining a loss from a loss function based on a comparison of the textual-quality-training score and a ground-truth-quality score; and adjusting network parameters of the text-quality classifier based on the determined loss.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 10:
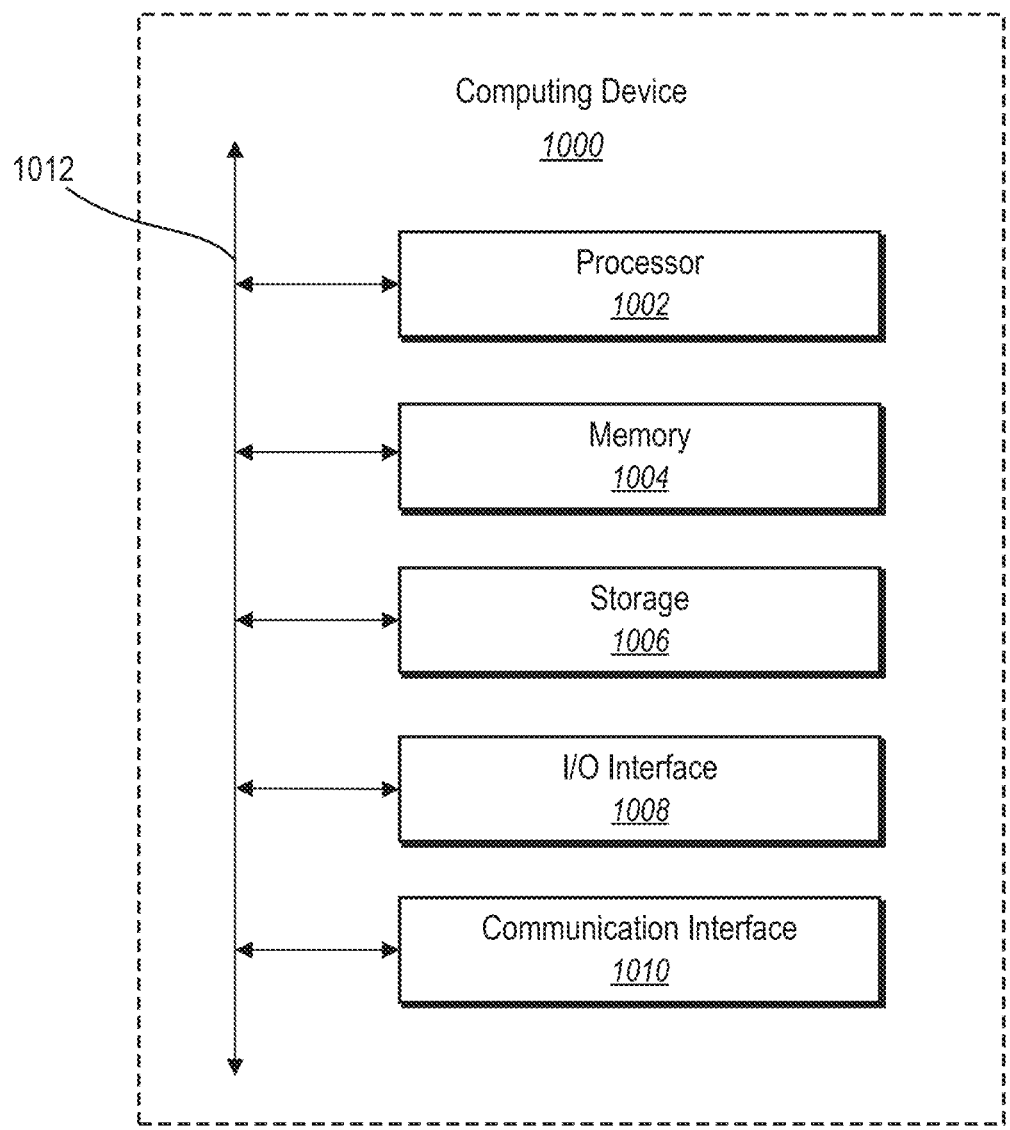
FIG. 10 illustrates a block diagram of a computing device in accordance with one or more embodiments.

FIG. 10 illustrates a block diagram of an exemplary computing device 1000 that may be configured to perform one or more of the processes described above. One will appreciate that one or more computing devices such as the computing device 1000 may implement the administrator device 109, the recipient devices 114a-114n, the server device(s) 102, and/or other devices described above in connection with FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While the exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers ("TLBs"). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive ("HDD"), a floppy disk drive, flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from the computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 11:
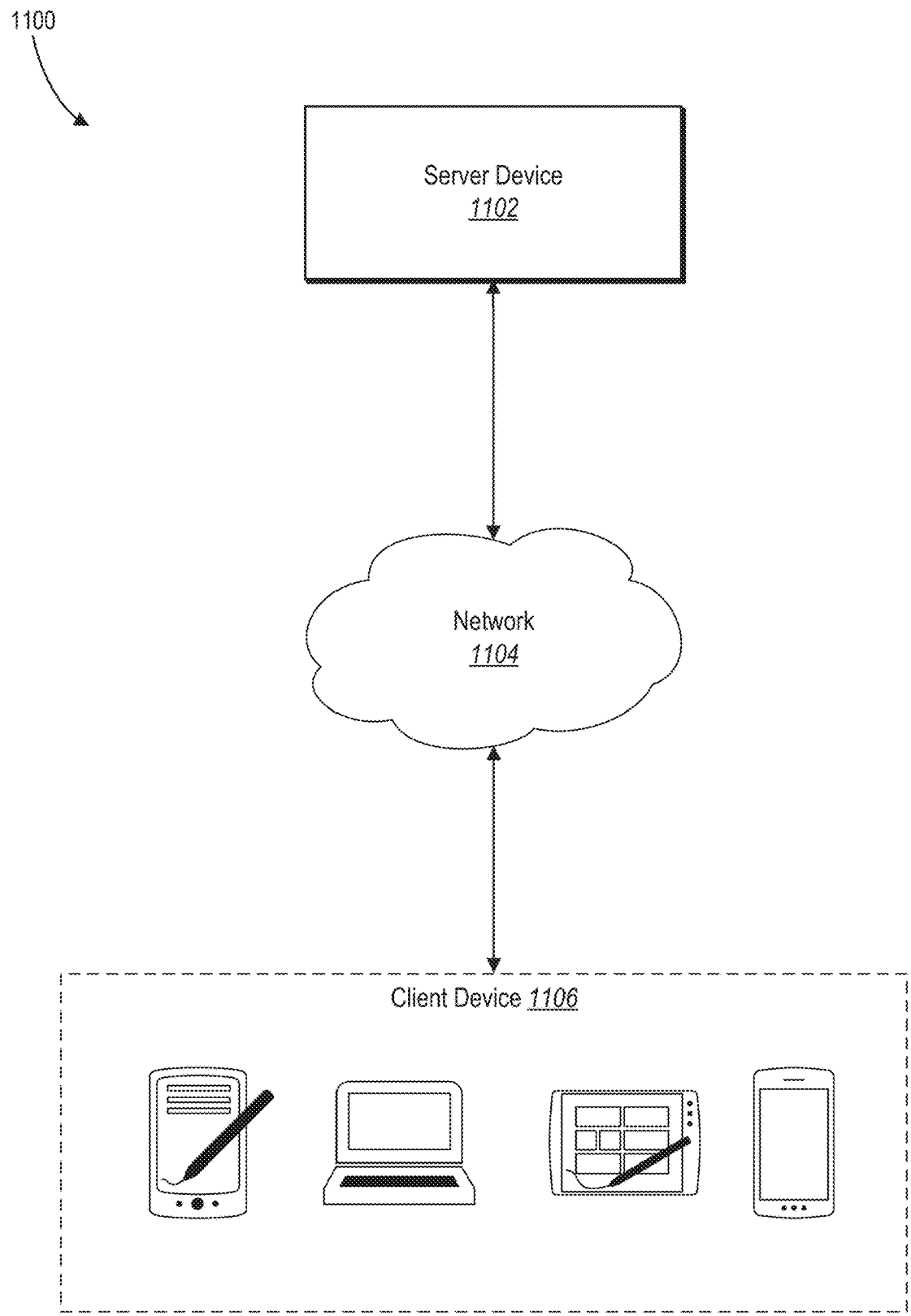
FIG. 11 illustrates a network environment of a digital survey system in accordance with one or more embodiments.

FIG. 11 illustrates an example network environment 1100 of the digital survey system 104. Network environment 1100 includes a client device 1106, and a server device 1102 connected to each other by a network 1104. Although FIG. 11 illustrates a particular arrangement of client device 1106, server device 1102, and network 1104, this disclosure contemplates any suitable arrangement of client device 1106, server device 1102, and network 1104. As an example and not by way of limitation, two or more of the client devices 1106, and server devices 1102 may be connected to each other directly, bypassing network 1104. As another example, two or more of client devices 1106 and server devices 1102 may be physically or logically co-located with each other in whole, or in part. Moreover, although FIG. 11 illustrates a particular number of client devices 1106, server devices 1102, and networks 1104, this disclosure contemplates any suitable number of client devices 1106, server devices 1102, and networks 1104. As an example and not by way of limitation, network environment 1100 may include multiple client devices 1106, server devices 1102, and networks 1104.

This disclosure contemplates any suitable network 1104. As an example and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, and server device 1102 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example and not by way of limitation, a client device 1106 may include any of the computing devices discussed above in relation to FIG. 10. A client device 1106 may enable a network user at client device 1106 to access network 1104.

In particular embodiments, client device 1106 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1106 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1106 one or more Hyper Text Markup Language ("HTML") files responsive to the HTTP request. Client device 1106 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1102 may include a variety of servers, sub-systems, programs, modules, logs, and data stores. In particular embodiments, server device 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 may also include suitable components such as network interfaces, security mechanisms, load balancers, failover servers, management-and-network-operations consoles, other suitable components, or any suitable combination thereof.

In particular embodiments, server device 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., users 116a and 116n, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A system comprising:
   at least one processor; and
   at least one non-transitory computer readable storage medium storing instructions that, when executed by the at least one processor, cause the system to:
   provide a set of textual responses to a text-quality classifier to generate a textual quality score for each textual response from the set of textual responses;
   determine a relevancy parameter, a sentiment indicator, and a topic for each textual response from the set of textual responses, wherein a given relevancy parameter indicates a relevance of a given textual response to a user query, a given sentiment indicator indicates a linguistic sentiment of the given textual response, and a given topic indicates a subject matter of the given textual response;
   generate a first response group of textual responses and a second response group of textual responses from the set of textual responses based on the sentiment indicator and the topic for each textual response from the set of textual responses; and
   select, for display on a client device, a first representative-textual response from the first response group and a second representative-textual response from the second response group based on the relevancy parameter for each textual response within the first response group and the relevancy parameter for each textual response within the second response group.

2. The system of claim 1, further comprising instructions that, when executed by the at least one processor, cause the system to:
   sort the set of textual responses by:
   selecting, from a response database, textual responses satisfying a textual-quality-score threshold; and
   sorting the selected textual responses based on the relevancy parameter for each textual response from the selected textual responses to create a sorted set of textual responses; and
   generate, from the sorted set of textual responses, the first response group of textual responses corresponding to a first range of sentiment indicators and the second response group of textual responses corresponding to a second range of sentiment indicators based on the sentiment indicator and the topic for each textual response from the sorted set of textual responses.

3. The system of claim 1, further comprising instructions that, when executed by the at least one processor, cause the system to:
   determine the sentiment indicator for each textual response by determining, for each textual response, a sentiment score indicating a positive sentiment or a negative sentiment;
   determine, for each textual response, a sentiment-polarity indicator based on the sentiment score for each textual response satisfying or not satisfying a positive-sentiment-score threshold or a negative-sentiment-score threshold; and
   generate the first response group of textual responses and the second response group of textual responses based on the sentiment score, the sentiment-polarity indicator, and the topic for each textual response from the set of textual responses.

4. The system of claim 1, further comprising instructions that, when executed by the at least one processor, cause the system to:
   determine the relevancy parameter for each textual response from the set of textual responses by determining, for each textual response, a topic-similarity score indicating a relevance of the textual response to a queried topic and a time identifier indicating a time associated with the textual response;
   select, for display on the client device, the first representative-textual response from the first response group based on the textual quality score, the topic-similarity score, and the time identifier for each textual response within the first response group; and
   select, for display on the client device, the second representative-textual response from the second response group based on the textual quality score, the topic-similarity score, and the time identifier for each textual response within the second response group.

5. The system of claim 1, further comprising instructions that, when executed by the at least one processor, cause the system to:
   provide the set of textual responses to the text-quality classifier by:

receiving, from a client device, a user query searching for textual responses corresponding to a time period; and selecting the set of textual responses based on a time identifier for each textual response corresponding to the time period indicated by the user query.

6. The system of claim 1, further comprising instructions that, when executed by the at least one processor, cause the system to determine the sentiment indicator for each textual response from the set of textual responses by determining, for each textual response, a sentiment score indicating a positive sentiment corresponding to the topic or a negative sentiment corresponding to the topic.

7. The system of claim 1, further comprising instructions that, when executed by the at least one processor, cause the system to generate a response summary for the set of textual responses based on the first representative-textual response and the second representative-textual response by generating the response summary for the set of textual responses comprising both the first representative-textual response and the second representative-textual response.

8. A non-transitory computer readable medium storing instructions thereon that, when executed by at least one processor, cause a computer device to:
provide a set of textual responses to a text-quality classifier to generate a textual quality score for each textual response from the set of textual responses;
determine a relevancy parameter, a sentiment indicator, and a topic for each textual response from the set of textual responses, wherein a given relevancy parameter indicates a relevance of a given textual response to a user query, a given sentiment indicator indicates a linguistic sentiment of the given textual response, and a given topic indicates a subject matter of the given textual response;
generate a first response group of textual responses and a second response group of textual responses from the set of textual responses based on the sentiment indicator and the topic for each textual response from the set of textual responses; and
select, for display on a client device, a first representative-textual response from the first response group and a second representative-textual response from the second response group based on the relevancy parameter for each textual response within the first response group and the relevancy parameter for each textual response within the second response group.

9. The non-transitory computer readable medium of claim 8, further comprising instructions that, when executed by the at least one processor, cause the computer device to:
sort the set of textual responses by:
selecting, from a response database, textual responses satisfying a textual-quality-score threshold; and
sorting the selected textual responses based on the relevancy parameter for each textual response from the selected textual responses to create a sorted set of textual responses; and
generate, from the sorted set of textual responses, the first response group of textual responses corresponding to a first range of sentiment indicators and the second response group of textual responses corresponding to a second range of sentiment indicators based on the sentiment indicator and the topic for each textual response from the sorted set of textual responses.

10. The non-transitory computer readable medium of claim 8, further comprising instructions that, when executed by the at least one processor, cause the computer device to:

determine the sentiment indicator for each textual response by determining, for each textual response, a sentiment score indicating a positive sentiment or a negative sentiment;
determine, for each textual response, a sentiment-polarity indicator based on the sentiment score for each textual response satisfying or not satisfying a positive-sentiment-score threshold or a negative-sentiment-score threshold; and
generate the first response group of textual responses and the second response group of textual responses based on the sentiment score, the sentiment-polarity indicator, and the topic for each textual response from the set of textual responses.

11. The non-transitory computer readable medium of claim 8, further comprising instructions that, when executed by the at least one processor, cause the computer device to:
determine the relevancy parameter for each textual response from the set of textual responses by determining, for each textual response, a topic-similarity score indicating a relevance of the textual response to a queried topic and a time identifier indicating a time associated with the textual response;
select, for display on the client device, the first representative-textual response from the first response group based on the textual quality score, the topic-similarity score, and the time identifier for each textual response within the first response group; and
select, for display on the client device, the second representative-textual response from the second response group based on the textual quality score, the topic-similarity score, and the time identifier for each textual response within the second response group.

12. The non-transitory computer readable medium of claim 8, further comprising instructions that, when executed by the at least one processor, cause the computer device to:
provide the set of textual responses to the text-quality classifier by:
receiving, from a client device, a user query searching for textual responses corresponding to a time period; and
selecting the set of textual responses based on a time identifier for each textual response corresponding to the time period indicated by the user query.

13. The non-transitory computer readable medium of claim 8, further comprising instructions that, when executed by the at least one processor, cause the computer device to determine the sentiment indicator for each textual response from the set of textual responses by determining, for each textual response, a sentiment score indicating a positive sentiment corresponding to the topic or a negative sentiment corresponding to the topic.

14. The non-transitory computer readable medium of claim 8, further comprising instructions that, when executed by the at least one processor, cause the computer device to generate a response summary for the set of textual responses based on the first representative-textual response and the second representative-textual response by generating the response summary for the set of textual responses comprising both the first representative-textual response and the second representative-textual response.

15. A computer-implemented method comprising:
providing a set of textual responses to a text-quality classifier to generate a textual quality score for each textual response from the set of textual responses;
determining a relevancy parameter, a sentiment indicator, and a topic for each textual response from the set of textual responses, wherein a given relevancy parameter indicates a relevance of a given textual response to a user query, a given sentiment indicator indicates a linguistic sentiment of the given textual response, and a given topic indicates a subject matter of the given textual response;

generating a first response group of textual responses and a second response group of textual responses from the set of textual responses based on the sentiment indicator and the topic for each textual response from the set of textual responses; and selecting, for display on a client device, a first representative-textual response from the first response group and a second representative-textual response from the second response group based on the relevancy parameter for each textual response within the first response group and the relevancy parameter for each textual response within the second response group.

16. The computer-implemented method of claim 15, further comprising:
sorting the set of textual responses by:
selecting, from a response database, textual responses satisfying a textual-quality-score threshold; and
sorting the selected textual responses based on the relevancy parameter for each textual response from the selected textual responses to create a sorted set of textual responses; and
generating, from the sorted set of textual responses, the first response group of textual responses corresponding to a first range of sentiment indicators and the second response group of textual responses corresponding to a second range of sentiment indicators based on the sentiment indicator and the topic for each textual response from the sorted set of textual responses.

17. The computer-implemented method of claim 15, further comprising:
determining the sentiment indicator for each textual response by determining, for each textual response, a sentiment score indicating a positive sentiment or a negative sentiment;
determining, for each textual response, a sentiment-polarity indicator based on the sentiment score for each textual response satisfying or not satisfying a positive-sentiment-score threshold or a negative-sentiment-score threshold; and
generating the first response group of textual responses and the second response group of textual responses based on the sentiment score, the sentiment-polarity indicator, and the topic for each textual response from the set of textual responses.

18. The computer-implemented method of claim 15, further comprising:
determining the relevancy parameter for each textual response from the set of textual responses by determining, for each textual response, a topic-similarity score indicating a relevance of the textual response to a queried topic and a time identifier indicating a time associated with the textual response;
selecting, for display on the client device, the first representative-textual response from the first response group based on the textual quality score, the topic-similarity score, and the time identifier for each textual response within the first response group; and
selecting, for display on the client device, the second representative-textual response from the second response group based on the textual quality score, the topic-similarity score, and the time identifier for each textual response within the second response group.

19. The computer-implemented method of claim 15, further comprising:
providing the set of textual responses to the text-quality classifier by:
receiving, from a client device, a user query searching for textual responses corresponding to a time period; and
selecting the set of textual responses based on a time identifier for each textual response corresponding to the time period indicated by the user query.

20. The computer-implemented method of claim 15, further comprising determining the sentiment indicator for each textual response from the set of textual responses by determining, for each textual response, a sentiment score indicating a positive sentiment corresponding to the topic or a negative sentiment corresponding to the topic.

* * * * *